United States Patent
Healey et al.

(10) Patent No.: US 11,731,068 B2
(45) Date of Patent: Aug. 22, 2023

(54) FILTER ELEMENT AND A FILTER ASSEMBLY

(71) Applicants: Dominic Healey, Halifax (GB); Adrian R. Mincher, South Cave (GB)

(72) Inventors: Dominic Healey, Halifax (GB); Adrian R. Mincher, South Cave (GB)

(73) Assignee: PARKER HANNIFIN EMEA S.A.R.L., Etoy (CH)

( * ) Notice: Subject to any disclaimer, the term of this patent is extended or adjusted under 35 U.S.C. 154(b) by 0 days.

(21) Appl. No.: 17/341,483

(22) Filed: Jun. 8, 2021

(65) Prior Publication Data

US 2022/0161179 A1 May 26, 2022

(30) Foreign Application Priority Data

Jun. 10, 2020 (GB) .................................... 2008791

(51) Int. Cl.
*B01D 46/24* (2006.01)
*B01D 46/00* (2022.01)
(Continued)

(52) U.S. Cl.
CPC ......... *B01D 46/24* (2013.01); *B01D 46/0004* (2013.01); *B01D 46/0087* (2013.01);
(Continued)

(58) Field of Classification Search
CPC ............... B01D 46/24; B01D 46/0004; B01D 46/0087; B01D 45/08; B01D 45/16;
(Continued)

(56) References Cited

U.S. PATENT DOCUMENTS

| 5,190,651 A | 3/1993 | Spencer |
| 7,070,642 B2 | 7/2006 | Scott |

(Continued)

FOREIGN PATENT DOCUMENTS

| CN | 203842393 U | 9/2014 |
| DE | 102005043695 A1 | 3/2007 |

(Continued)

OTHER PUBLICATIONS

Search Report dated Dec. 11, 2020 for UK application GB2008791.2.

(Continued)

*Primary Examiner* — Dung H Bui
(74) *Attorney, Agent, or Firm* — Christopher H. Hunter

(57) ABSTRACT

A filter assembly 7 for separating contaminants from a fluid stream is described. The filter assembly 7 comprises a filter element 58 which is locatable within chamber 19 in a flow path extending between inlet 54 and outlet 56. The filter element 58 comprises a filter media component 60, and the filter element is locatable within the chamber 19 in the flow path so that fluid flowing from the inlet 54 to the outlet 56 is directed through the filter media component. The filter assembly 7 comprises at least one first alignment assembly having a first alignment component 64a provided by the housing portion 21c and disposed within chamber 19, and a second alignment component 66a provided by the filter element 58. The first and second alignment components 64a and 66a cooperate to rotationally orient the filter element 58 within the chamber 19.

63 Claims, 6 Drawing Sheets

(51) Int. Cl.
    *F01M 13/00* (2006.01)
    *B01D 50/20* (2022.01)
    *B01D 45/08* (2006.01)
    *B01D 45/16* (2006.01)
(52) U.S. Cl.
    CPC ............ *F01M 13/00* (2013.01); *B01D 45/08* (2013.01); *B01D 45/16* (2013.01); *B01D 50/20* (2022.01); *B01D 2265/021* (2013.01)
(58) Field of Classification Search
    CPC .............. B01D 50/20; B01D 2265/021; B01D 2265/024; B01D 2265/026; B01D 46/003; B01D 46/0045; B01D 46/2414; B01D 46/2422; B01D 2201/24; B01D 2201/295; B01D 2201/301; B01D 2201/4053; F01M 13/00
    See application file for complete search history.

(56) References Cited

U.S. PATENT DOCUMENTS

| | | | |
|---|---|---|---|
| 8,758,467 B2 * | 6/2014 | Lundgren | B01D 46/0005 55/423 |
| 9,346,002 B2 | 5/2016 | Kleynen | |
| 10,357,728 B2 | 7/2019 | Ardes | |
| 10,519,827 B2 * | 12/2019 | Ishida | F01M 13/0416 |
| 2004/0035094 A1 * | 2/2004 | Jersey | B01D 46/2414 55/498 |
| 2010/0064646 A1 | 3/2010 | Smith | |
| 2017/0361252 A1 | 12/2017 | Vogt | |
| 2019/0168149 A1 | 6/2019 | Albertini | |
| 2021/0138365 A1 * | 5/2021 | Girondi | B01D 35/30 |

FOREIGN PATENT DOCUMENTS

| | | |
|---|---|---|
| EP | 3269952 A1 | 1/2018 |
| WO | 2008115985 A2 | 9/2008 |
| WO | 2018095941 A1 | 5/2018 |
| WO | 2019012425 A1 | 1/2019 |

OTHER PUBLICATIONS

Extended European Search Report for EP 21177723.0 dated Jan. 25, 2022.
Partial Search Report for EP 21177723.0 dated Oct. 7, 2021.

* cited by examiner

FILTER ELEMENT AND A FILTER ASSEMBLY

CROSS REFERENCE TO RELATED APPLICATIONS

The present application claims the benefit of the filing date of Great Britain Application Serial No. 2008791.2, filed on 10 Jun. 2020, the disclosure of which is incorporated herein by reference.

FIELD OF THE INVENTION

The present disclosure relates to a filter element for separating contaminants from a fluid stream, and to a filter assembly including such a filter element, useful for a Closed Crankcase Ventilation (CCV) system.

BACKGROUND

Blow-by gas within a reciprocating engine is generated as a by-product of the combustion process. During combustion, some of the mixture of combustion gases escapes past piston rings or other seals and enters the engine crankcase outside of the pistons. The term "blow-by" refers to the fact that the gas has blown past the piston seals. The flow level of blow-by gas is dependent upon several factors, for example the engine displacement, the effectiveness of the piston cylinder seals and the power output of the engine. Blow-by gas typically has the following components: oil (as both a liquid and an aerosol, with aerosol droplets in the range 0.1 μm to 10 μm), soot particles, nitrous oxides (NOx), hydrocarbons and other organic species, carbon monoxide, carbon dioxide, oxygen, water, and other gaseous air components.

If blow-by gas is retained within a crankcase with no outlet, the pressure within the crankcase rises until the pressure is relieved by leakage of crankcase oil elsewhere within the engine, for example at the crankcase seals, dipstick seals or turbocharger seals. Such a leak may result in damage to the engine.

In order to prevent such damage, and excessive loss of oil, it has been known to provide an outlet valve that allows the blow-by gas to be vented to the atmosphere. However, with increasing environmental awareness generally, and within the motor industry in particular, it has become unacceptable to allow blow-by gas to be vented to atmosphere due to the discharge of oil and other contaminants from within the crankcase. Furthermore, such venting increases the speed at which crankcase oil is consumed.

Consequently, it has become known to filter the blow-by gas. The filtered blow-by gas may then either be vented to the atmosphere as before (in an open loop system) or may be returned to an air inlet of the engine (in a closed loop system). The blow-by gas may pass through a filtering medium or another known form of gas contaminant separator. The conventional arrangement of an engine blow-by gas/oil separator returning cleaned gas to an engine air intake is commonly referred to as a Closed Crankcase Ventilation (CCV) system.

The filtering of engine blow-by gas using impaction separators which remove contaminants (particularly oil aerosols) from the gas is well known. Typically, separators are fitted downstream of the gases being vented from the engine crankcase, with oil that is separated from the blow-by gasses returned to the engine sump via a drain hose.

International Patent Publication No. WO-2013/017832A1 discloses a CCV system comprising a separator having first and second separation stages. Contaminated engine crankcase blow-by gases enter a first chamber of the separator and are passed to a first separation stage in the form of an impactor separator. The first chamber is separated from a second chamber by a rolling diaphragm of the impactor separator, which forms a radial seal at the interface between the chambers. The first chamber has approximately the same pressure as the engine crankcase, while the second chamber references atmosphere. The blow-by gas then enters a third chamber by passing through an acceleration aperture. Impaction and separation of oil particles due to radial acceleration occurs both on the diaphragm face, and on the surface of an annular coalescer material inserted opposite an outlet of the acceleration aperture. The second separation stage is arranged to receive the blow-by gas which has exited the first impactor separation stage, the gas flowing from the third chamber to the second separation stage. The second separation stage can comprise a filter media type separator, which may take the form of a filter element. The filter element removes further contaminants from the fluid stream.

A jet pump is connected downstream of the second separation stage, to create pressure lift which draws the fluid stream through the first and second stages. The jet pump is powered via air bleed from a turbocharger of the engine, and thus synergy is used to create pressure lift. The developed pressure lift is used particularly to enhance the performance of the impactor separator, subjecting the third chamber to a vacuum. Separated oil is agglomerated into liquid droplets which drain through both separation stages and into a sump. This oil will drain into the first chamber when the engine is keyed off, or at some idle conditions when the differential over the valve is less than 1 mbar. When the oil reaches the first chamber, it can drain through a lower spigot back to the engine crankcase.

Over time, the filter media of the filter element can become clogged with contaminants (particularly oil) and has to be replaced in order to ensure efficient separation performance. To achieve this, it is necessary to access an interior of a housing of the separator defining a chamber in which the filter element is located. The housing includes a closure portion which can be released from a main part of the housing in order to access the filter element.

Whilst the system disclosed in WO-2013/017832A1 provides an efficient separation of contaminants from engine crankcase blow-by gases, there is a desire to further improve upon features of the disclosed system. In particular, it may be desirable to facilitate assembly and/or maintenance of the separator, including location of a filter element within a housing of the separator during initial assembly and/or a subsequent maintenance procedure (which might involve removal of the filter element and its replacement with a fresh element). It may be additionally or alternatively be desirable to adjust fluid flow through the separator and/or separation efficiency.

SUMMARY

The present disclosure will be described with particular reference to a filter assembly forming part of a separator of the type disclosed in WO-2013/017832A1. However, it will be understood that the filter assembly and filter element disclosed in this document may have a use in relation to filter assemblies other than that forming part of the separator disclosed in WO-2013/017832A1.

According to a first aspect of the present disclosure, there is provided a filter assembly for filtering contaminants from a fluid stream, the filter assembly comprising:

a. a housing defining a chamber and an opening which communicates with the chamber, the chamber having an inlet arranged to receive a fluid stream including entrained contaminants, and an outlet through which the fluid stream can exit the chamber following removal of contaminants;
b. a filter element having a first end, a second end, a passage extending along the element between the first and second ends and a filter media component extending around the passage, the filter element being locatable within the chamber in a flow path extending between the inlet and the outlet so that fluid flowing along the flow path is directed through the filter media component;
c. in which the housing opening is dimensioned so that the filter element can pass through the opening for location in the chamber, and in which the filter assembly comprises a cover which can be coupled to the housing to close the opening and secure the filter element within the chamber;
d. at least one first alignment assembly having a first alignment component and a second alignment component, one of the first and second alignment components being provided by the housing and disposed within the chamber, and the other being provided by the filter element, the first and second alignment components cooperating to rotationally orient the filter element within the chamber; and
e. at least one second alignment assembly having a first alignment component and a second alignment component, one of the first and second alignment components being provided by the housing and disposed within the chamber, and the other being provided by the cover, the first and second alignment components cooperating to rotationally orient the cover relative to the housing and so to the filter element.

The filter assembly of the first aspect may facilitate insertion of the filter element into the chamber in a desired rotational orientation, which may ensure correct operation of the assembly during use. For example, sealing abutment between: the filter element and seal features provided by one or both of the housing and the cover; and/or between a seal feature provided by the element and the housing; and/or between a seal feature provided by the element and the cover, may be correctly achieved.

The filter assembly of the first aspect may prevent insertion of an incorrect filter element into the chamber, which could otherwise lead to impaired or incorrect performance, and/or may prevent rotational orientation of an incorrect element within the chamber. For example, the first and second alignment components of the first alignment assembly may cooperate so that insertion of an incorrect element into the chamber is prevented, or so that rotational orientation of the incorrect element within the chamber is prevented. An incorrect element will not carry the required alignment component, and may then be prevented from being located within the chamber by the alignment component that is provided by the housing (or other features of the housing), and/or from being correctly rotationally oriented.

The chamber may have a longitudinal axis. The chamber may have first and second opposite axial ends. The filter element may have a longitudinal axis extending between the first and second ends. The outlet may be spaced from the longitudinal axis of the chamber and may extend generally transverse to the longitudinal axis of the chamber. The outlet may extend from a side of the chamber and may be disposed between the first and second ends of the chamber.

The filter element may be disposed in an offset location within the chamber and may be eccentrically located. The filter element may be offset relative to the chamber outlet and may be laterally or radially offset. The first and second alignment components of the first alignment assembly may cooperate to rotationally orient the filter element within the chamber so that a desired spacing is provided between the chamber outlet and an outer surface described by a part of the filter media component facing generally towards the outlet. The filter element and the housing may be arranged so that, when the filter element is located within the chamber, a generally annular space exists between an outer surface of the filter element and the housing wall (suitably an inner surface of the housing wall). A width of the annular space may vary around a perimeter of the filter element. A distance between the outer surface and the chamber outlet may be greater than a distance between the outer surface and the housing wall at a location that is spaced around a perimeter of the chamber from the outlet. This may reduce a likelihood of contaminants on an external surface of the filter media component becoming re-entrained in a flow of 'clean' fluid passing around the filter element in the annular space towards the outlet, by increasing a spacing between the external surface and the outlet in the low-pressure zone which exists in the vicinity of the outlet.

The filter element may be non-coaxially located within the chamber. The first and second alignment components of the first alignment assembly may cooperate to rotationally orient the filter element within the chamber so that the longitudinal axis of the filter element is offset relative to the longitudinal axis of the chamber. The offset may be taken to be in a lateral direction, a radial direction, and/or a direction taken relative to a side wall of the filter assembly defined by the housing.

The filter element passage may have a first opening at the first end and a second opening at the second end. The first and second alignment components of the second alignment assembly may cooperate to rotationally orient the cover relative to the housing and so to the filter element, so that the cover closes the opening of the filter element passage disposed adjacent or proximate the cover when the cover is coupled to the housing. This may facilitate direction of the fluid stream through the filter media component.

The passage may extend along the filter element between an opening at the first end and an opening at the second end. The cover may comprise a pressure relief valve which closes the opening at the one of the first and second ends of the filter element that is disposed adjacent the cover when the filter element is located in the chamber and the cover is coupled to the housing. The pressure relief valve may be biased to a closed position and may be movable to an open position when the pressure of fluid within the passage of the filter element reaches a predetermined level. This may provide the advantage that the filter element can be bypassed, for example if the filter media component of the element becomes clogged with contaminants (leading to an increased pressure drop across the media component), which may require that the element be replaced. The fluid pressure may act against the valve bias to move it from its closed position towards its open position. The valve may be or may comprise a flexible diaphragm. The diaphragm may be naturally or inherently biased towards the closed position (for example by features of its shape and/or a material from which it is formed), and/or the valve may comprise a biasing member, such as a spring, for urging the diaphragm towards the closed position.

The pressure relief valve may be eccentrically located relative to or within the cover. The cover may have a centre, the pressure relief valve may have a centre, and the centre of the valve may be offset relative to the centre of the cover. Where the longitudinal axis of the filter element is offset relative to the longitudinal axis of the chamber, the centre of the valve may be substantially aligned with the longitudinal axis of the filter element. The centre of the valve may therefore be disposed on (or substantially on) the longitudinal axis of the element, when the cover is coupled to the housing. In this way, location of an incorrect filter element in the chamber may have the result that the pressure relief valve cannot correctly engage the element, when the cover is coupled to the housing and the valve biased to its closed position. Such may be due to the element being in a non-eccentric position in the chamber, for example centred on or aligned with the chamber axis. The centre of the cover may be substantially aligned with the centre of the chamber. The centre of the cover may therefore be disposed on the longitudinal axis of the chamber, when the cover is coupled to the housing.

The passage of the filter element may extend part way along an entire length of the element between the first and second ends. The passage may extend part way along a length of the element from one of the first and second ends towards the other one of the ends.

The first and second alignment components of the first alignment assembly may cooperate to define a single permissible rotational orientation of the filter element within the chamber. This may be achieved by appropriate positioning of the components on the housing (in the chamber) and on the filter element. It may be preferred to provide such a single permissible rotational orientation in order to ensure a desired eccentric positioning of the element within the chamber, as described elsewhere in this document.

The first and second alignment components of the second alignment assembly may cooperate to define a single permissible rotational orientation of the cover relative to the housing. This may be achieved by appropriate positioning of the components on the housing (in the chamber) and on the cover. It may be preferred to provide such a single permissible rotational orientation in order to ensure a desired eccentric positioning of a valve member carried by the cover, as described elsewhere in this document.

The one of the first and second alignment components of the first alignment assembly provided by the housing, and the one of the first and second alignment components of the second alignment assembly provided by the housing, may be provided by a single or common component. Thus, for example a single or common alignment component may be provided by the housing which provides the function of both rotationally orienting the filter element within the chamber, and of rotationally orienting the cover relative to the housing.

The first alignment assembly may comprise more than one first alignment component, and more than one second alignment component. The alignment components provided by the housing may be arranged in a pattern or configuration which is matched by the alignment components provided by the filter element.

The second alignment assembly may comprise more than one first alignment component, and more than one second alignment component. The alignment components provided by the housing may be arranged in a pattern or configuration which is matched by the alignment components provided by the cover.

The alignment component(s) provided by the housing may extend inwardly, optionally generally radially inwardly, from a wall of the housing into the chamber.

The first alignment component of the first alignment assembly may be a male alignment component, and the second alignment component may be a female alignment component. Where the first alignment assembly comprises more than one first alignment component and more than one second alignment component, a mixture of different types of first alignment components, and different types of second alignment components, may be provided. For example, at least one of the first alignment components may be a male component and at least one a female component. At least one of the second alignment components may be a female component and at least one a male component.

The first alignment component of the second alignment assembly may be a male alignment component, and the second alignment component may be a female alignment component. Where the second alignment assembly comprises more than one first alignment component and more than one second alignment component, a mixture of different types of first alignment components, and different types of second alignment components, may be provided. For example, at least one of the first alignment components may be a male component and at least one a female component. At least one of the second alignment components may be a female component and at least one a male component.

The female alignment components may each be adapted to cooperate with the respective male alignment component by receiving the male component, suitably in a sliding fit. The male and female alignment components may each be elongate. The female alignment components may each define a keyway, slot, channel, recess, passage or the like. The male alignment components may each define a protrusion such as a key, rib, tongue or the like.

The chamber may have or may define a perimeter. The chamber may be generally cylindrical in shape, and the perimeter may be a circumference. The housing may have a wall which defines the chamber, the wall forming the perimeter.

The first alignment assembly may comprise a plurality of first alignment components and a corresponding plurality of second alignment components. The alignment components of the first alignment assembly provided by the housing may be provided on or in the wall. The alignment components of the first alignment assembly provided by the housing may be spaced apart around the perimeter of the chamber and may be non-equidistantly spaced apart. An angle between one alignment component provided by the housing and an adjacent alignment component, taken in a first direction around the perimeter, may be different to an angle between the one alignment component and an adjacent alignment component, taken in a second direction around the perimeter. Where the housing provides more than two alignment components, the alignment components which are adjacent to the one alignment component, considered in the first and second directions, may be different alignment components. The alignment component provided by the housing may be substantially disposed on, or may extend generally parallel to, a radius of the chamber. The alignment component provided by the housing may be substantially disposed on a line which is transverse to a radius of the chamber or may extend generally transverse to a radius of the chamber. Where the housing provides a plurality of alignment components: at least one may be disposed on, or may extend generally parallel to, a radius of the chamber; and at least one may be disposed on a line which is transverse to a radius of the chamber, or may extend generally transverse to a radius of the chamber.

The second alignment assembly may comprise a plurality of first alignment components and a corresponding plurality of second alignment components. The alignment components of the second alignment assembly provided by the housing may be provided on or in the wall. The alignment components of the second alignment assembly provided by the housing may be spaced apart around the perimeter of the chamber and may be non-equidistantly spaced apart. An angle between one alignment component provided by the housing and an adjacent alignment component, taken in a first direction around the perimeter, may be different to an angle between the one alignment component and an adjacent alignment component, taken in a second direction around the perimeter. Where the housing provides more than two alignment components, the alignment components which are adjacent to the one alignment component, considered in the first and second directions, may be different alignment components. The alignment component provided by the housing may be substantially disposed on, or may extend generally parallel to, a radius of the chamber. The alignment component provided by the housing may be substantially disposed on a line which is transverse to a radius of the chamber or may extend generally transverse to a radius of the chamber. Where the housing provides a plurality of alignment components: at least one may be disposed on, or may extend generally parallel to, a radius of the chamber; and at least one may be disposed on a line which is transverse to a radius of the chamber, or may extend generally transverse to a radius of the chamber.

The cover may comprise an outer lid portion, and an inner wall portion extending from the lid portion. The cover may be generally circular in shape. The inner wall portion may be generally circular in shape. The inner wall portion may extend in a direction towards the chamber, when the cover is coupled to the housing.

The alignment components of the second alignment assembly provided by the cover may be spaced apart around a perimeter of the cover, which perimeter may be defined by the inner wall portion and may be non-equidistantly spaced apart. An angle between one alignment component provided by the cover and an adjacent alignment component, taken in a first direction around the perimeter, may be different to an angle between the one alignment component and an adjacent alignment component, taken in a second direction around the perimeter. Where the cover provides more than two alignment components, the alignment components which are adjacent to the one alignment component, considered in the first and second directions, may be different alignment components. The alignment component provided by the cover may be substantially disposed on, or may extend generally parallel to, a radius of the cover. The alignment component provided by the cover may be substantially disposed on a line which is transverse to a radius of the cover or may extend generally transverse to a radius of the cover. Where the cover provides a plurality of alignment components: at least one may be disposed on, or may extend generally parallel to, a radius of the cover; and at least one may be disposed on a line which is transverse to a radius of the cover, or may extend generally transverse to a radius of the cover.

The chamber may have a first end and a second end, which may be axial ends. The first end may be adapted to sealingly abut the filter element. The first end may define or comprise the inlet. The housing opening may be provided at the second end of the chamber.

At least one alignment component provided by the housing may extend part way along a length of the housing between the first and second ends of the chamber. At least one alignment component provided by the housing may extend from the first end of the chamber towards the second end. At least one alignment component provided by the housing may extend from the second end of the chamber towards the first end. At least one alignment component provided by the housing may extend from the first end to the second end, along the entire length of the chamber. Said alignment component may form one of the first and second alignment components of the first alignment assembly, and one of the first and second alignment components of the second alignment assembly, and so optionally a single or common alignment component which provides the function of both rotationally orienting the filter element within the chamber, and of rotationally orienting the cover relative to the housing.

The cover may comprise an engagement feature or features for engaging a corresponding engagement feature or features of the housing. The engagement feature of the cover may be a thread provided on an inner surface of a wall of the cover. The engagement feature of the housing may be a matching thread provided on an outer surface of the housing, suitably adjacent the opening. The cover may comprise a part defining the thread (such as a collar), and a part defining the relevant alignment component of the second alignment assembly. The part defining the thread may be rotatable relative to the part defining the alignment component. This may enable rotation of the threaded part, for coupling the cover to the housing, without rotating the part defining the alignment component (and so maintaining alignment between the component on the cover and the component on the housing).

According to a second aspect of the present disclosure, there is provided a filter assembly for filtering contaminants from a fluid stream, the filter assembly comprising:
  a. a housing defining a chamber and an opening which communicates with the chamber, the chamber having a longitudinal axis, an inlet arranged to receive a fluid stream including entrained contaminants, and an outlet through which the fluid stream can exit the chamber following removal of contaminants;
  b. a filter element having a first end, a second end, a longitudinal axis extending between the first and second ends, a passage extending along the element between the first and second ends and a filter media component extending around the passage, the filter element adapted to be located within the chamber in a flow path extending between the inlet and the outlet so that fluid flowing along the flow path is directed through the filter media component;
  c. in which the housing opening is dimensioned so that the filter element can pass through the opening for location in the chamber, and in which the filter assembly comprises a cover which can be coupled to the housing to close the opening and secure the filter element within the chamber;
  d. and in which the filter element and the housing are arranged so that, when the filter element is located within the chamber, the longitudinal axis of the filter element is offset relative to the longitudinal axis of the chamber.

According to a third aspect of the present disclosure, there is provided a filter assembly for filtering contaminants from a fluid stream, the filter assembly comprising:

a. a housing defining a chamber and an opening which communicates with the chamber, the chamber having a longitudinal axis, an inlet arranged to receive a fluid stream including entrained contaminants, and an outlet through which the fluid stream can exit the chamber following removal of contaminants, the outlet extending through a wall of the housing transverse to the longitudinal axis;

b. a filter element having a first end, a second end, a passage extending along the element between the first and second ends and a filter media component extending around the passage, the filter element adapted to be located within the chamber in a flow path extending between the inlet and the outlet so that fluid flowing along the flow path is directed through the filter media component;

c. in which the housing opening is dimensioned so that the filter element can pass through the opening for location in the chamber, and in which the filter assembly comprises a cover which can be coupled to the housing to close the opening and secure the filter element within the chamber;

d. and in which the filter element and the housing are arranged so that, when the filter element is located within the chamber, a generally annular space exists between an outer surface of the filter element and the housing wall, a distance between the outer surface and the chamber outlet being greater than a distance between the outer surface and the housing wall at a location that is spaced around a perimeter of the chamber from the outlet.

According to a fourth aspect of the present disclosure, there is provided a filter assembly for filtering contaminants from a fluid stream, the filter assembly comprising:

a. a housing defining a chamber and an opening which communicates with the chamber, the chamber having a longitudinal axis, an inlet arranged to receive a fluid stream including entrained contaminants, and an outlet through which the fluid stream can exit the chamber following removal of contaminants;

b. a filter element having a first end, a second end, a longitudinal axis extending between the first and second ends, a passage extending along the element between an opening at the first end and an opening at the second end, and a filter media component extending around the passage, the filter element being adapted to be located within the chamber in a flow path extending between the inlet and the outlet so that fluid flowing along the flow path is directed through the filter media component;

c. in which the housing opening is dimensioned so that the filter element can pass through the opening for location in the chamber, and in which the filter assembly comprises a cover which can be coupled to the housing to close the housing opening and secure the filter element within the chamber;

d. in which the filter element and the housing are arranged so that, when the filter element is located within the chamber, the longitudinal axis of the filter element is offset relative to the longitudinal axis of the chamber;

e. and in which the cover comprises a pressure relief valve which closes the opening at the one of the first and second ends of the filter element that is disposed adjacent the cover when the filter element is located in the chamber and the cover is coupled to the housing, the pressure relief valve being biased to a closed position and movable to an open position when the pressure of fluid within the passage of the filter element reaches a predetermined level.

Further features of the filter assemblies of the second, third and/or fourth aspects may be derived from the text set out elsewhere in this document, particularly in or with reference to the filter assembly of the first aspect.

Filter assemblies according to further aspects of the present disclosure may comprise features derived from one of more of the first to fourth aspects set out above.

Further features of the filter element forming part of the filter assemblies of the first to fourth aspects may be derived from the text set out elsewhere in this document, particularly in or with reference to the filter element of the fifth to seventh aspects.

Optional further features of the filter assemblies of the first to fourth aspects may be derived from the following text.

In use, the fluid stream may flow into the chamber through the inlet, for subsequent flow through the filter element. The fluid stream may flow from the inlet and into the passage of the filter element, for subsequent flow through the filter media component, where contaminants are filtered and so removed from the fluid stream. The filtered fluid stream may then flow to the outlet, optionally for discharge from the filter assembly. It is conceivable however that the fluid stream may flow from the inlet to an exterior of the filter element, before passing through the filter media component and into the passage, filtered fluid exiting the passage flowing to the outlet.

The fluid stream may be a gaseous stream comprising entrained liquid contaminants. The filter assembly may be for a crankcase ventilation system of a combustion engine. In the case of a crankcase ventilation system, the fluid stream may be blow-by gas and the liquid contaminant may be or may comprise oil. Other contaminants, including solids particles, may be carried in the fluid stream and may be filtered by the filter media component.

The filter media component may extend around the passage so that it surrounds the passage. The filter media component may be disposed radially outwardly of the passage and may circumscribe the passage/longitudinal axis of the element.

The filter element may be generally cylindrical in shape, comprising a cylindrical outer surface, which may be defined by the filter media component.

Reference is made herein to the removal of contaminants from the fluid stream. It will be understood that the filter assembly will remove at least some of the contaminants from the fluid stream during use. Whilst the filter media component provides effective removal of contaminants from the fluid stream, it will be understood that at least some contaminants may remain and pass to the outlet.

The filter assembly may form part of a system further comprise a separator for separating contaminants from a fluid stream. The separator may be provided upstream of the filter assembly and may be arranged so that the fluid stream exiting the separator passes to the inlet of the filter assembly for subsequent flow through the filter element. The separator may comprise a chamber having an inlet through which a fluid stream enters the chamber, to flow axially along the chamber. The separator may comprise an impaction surface located downstream of the chamber, which is arranged to deflect the fluid stream after the fluid stream leaves the chamber such that contaminants are separated from the fluid stream. The separator may comprise a dividing wall which separates the chamber from the impaction surface, the dividing wall having at least one aperture formed in it through which the fluid stream can pass out of the chamber towards the impaction surface. The separator may comprise an actuator which is arranged to move along an actuator axis to adjust an open cross-sectional area of the at least one aperture in the dividing wall according to a pressure differential between fluid pressure in the chamber and a pressure reference by moving along the dividing wall so as progressively to occlude the at least one aperture. The actuator may comprise a flexible diaphragm for occluding the at least one aperture. Suitable separators are disclosed in International patent publication nos. WO-2019/211358A1 and WO-2013/017832A1, the disclosures of which are incorporated herein by this reference.

One of the first and second ends of the filter element may comprise a sealing member for sealing the element relative to the housing. The other one of the first and second ends of the filter element may comprise a sealing member for sealing the element relative to the cover. One of the first and second ends of the filter element may comprise an end cap including an annular body defining an opening into the cavity, the end cap including a sealing member along a radially outer surface of the annular body, the sealing member having a repeating, undulating, non-planar geometry circumscribing the outer diameter of the body. The undulating geometry of the sealing member may have a repeating axial amplitude around the outer diameter of the body. The sealing member geometry may include at least one lobe around the outer diameter of the body, and optionally multiple lobes. The multiple lobes may be equally circumferentially spaced around the outer diameter of the body. A filter element comprising such an annular body and sealing member is disclosed in US Patent Publication no. US-2012/0181224A1, the disclosure of which is incorporated herein by this reference.

Reference is made in this document to a filter element. The term filter cartridge may be used interchangeably with the term filter element.

According to a fifth aspect of the present disclosure, there is provided a filter element for separating contaminants from a fluid stream, the filter element adapted to be located within a chamber defined by a housing of a filter assembly so that the filter element is in a flow path extending between an inlet of the chamber and an outlet of the chamber, the filter element comprising:
  a. a first end, a second end, a longitudinal axis extending between the first and second ends, a passage extending along the element between the first and second ends, and a filter media component extending around the passage; and
  b. a flange extending transverse to the longitudinal axis, the flange describing an outermost perimeter of the filter element, a first part of the perimeter defined by the flange disposed a first distance from the longitudinal axis, and a second part of the perimeter defined by the flange disposed a second distance from the longitudinal axis which is less than the first distance;
  c. in which the flange comprises an alignment component of an alignment assembly which is adapted to cooperate with a further alignment component of the assembly provided by the housing and disposed within the chamber, to facilitate rotational orientation of the filter element within the chamber.

Provision of a flange having an outer perimeter including the first and second parts may facilitate location of the filter element in the chamber of the filter assembly housing in a position in which the longitudinal axis of the filter element is offset from a longitudinal axis of the chamber. This may be desirable in order to provide a varying annular spacing around an outer periphery of the filter element, between an outer surface of the element and an inner surface of the housing defining the chamber.

The second part of the perimeter may be spaced around the perimeter from the first part. The flange may be generally circular in shape, and the second part may be spaced around a circumference of the flange from the first part.

The alignment component of the flange may be a female alignment component. The alignment component of the housing, which the flange alignment component cooperates with, may be a male alignment component. The alignment component of the flange may be a male alignment component. The alignment component of the housing, which the flange alignment component cooperates with, may be a female alignment component.

The flange may comprise a plurality of alignment components, for cooperating with respective alignment components of the housing. Where the flange comprises more than one alignment component, a mixture of different types of alignment components may be provided. For example, at least one of the alignment components may be a male component and at least one a female component.

The or each female alignment component may be adapted to cooperate with a respective male alignment component by receiving the male component, suitably in a sliding fit. The male and female alignment components may each be elongate. The female alignment components may each define a keyway, slot, channel, recess, passage or the like. The male alignment components may each define a protrusion such as a key, rib, tongue or the like.

Where the flange comprises more than one alignment component, the alignment components may be spaced apart around the perimeter of the flange and may be non-equidistantly spaced apart. An angle between one alignment component provided by the flange and an adjacent alignment component, taken in a first direction around the perimeter, may be different to an angle between the one alignment component and an adjacent alignment component, taken in a second direction around the perimeter. Where the flange comprises more than two alignment components, the alignment components which are adjacent to the one alignment component, considered in the first and second directions, may be different alignment components. The alignment component provided by the flange may be substantially disposed on, or may extend generally parallel to, a radius extending from a centre of the flange. The alignment component provided by the flange may be substantially disposed on a line which is transverse to a radius extending from a centre of the flange or may extend generally transverse to a radius. Where the flange comprises a plurality of alignment components: at least one may be disposed on, or may extend generally parallel to, a radius extending from a centre of the flange; and at least one may be substantially disposed on a line which is transverse to a radius extending from a centre of the flange, or may extend generally transverse to a radius.

The alignment component of the flange may extend generally inwardly from the perimeter. Where the flange comprises a plurality of alignment components, at least one alignment component may extend inwardly a greater distance than at least one other alignment component.

The alignment component of the flange may extend generally outwardly from the perimeter. Where the flange comprises a plurality of alignment components, at least one alignment component may extend outwardly a greater distance than at least one other alignment component.

The flange may comprise a mixture of inwardly and outwardly extending alignment components.

The alignment component may be provided at the perimeter of the flange. Where the alignment component of the flange is a female component, it may have an opening at the perimeter and may extend inwardly from the opening.

The filter element may have a generally cylindrical outer periphery. The filter element may comprise a first end cap at the first end and a second end cap at the second end. The end caps may each comprise an opening which communicates with the passage, and the openings may be coaxially aligned along the longitudinal axis. One of the end caps may define the flange and may be arranged non-concentrically with respect to the other end cap, optionally with its opening disposed off-centre in the end cap. Optionally, the passage is disposed coaxial to the longitudinal axis.

According to a sixth aspect of the present disclosure, there is provided a filter element for separating contaminants from a fluid stream, the filter element adapted to be located within a chamber defined by a housing of a filter assembly so that the filter element is in a flow path extending between an inlet of the chamber and an outlet of the chamber, the filter element comprising:
 a. a first end, a second end, a longitudinal axis extending between the first and second ends, a passage extending along the element between the first and second ends, and a filter media component extending around the passage, the passage being coaxial to the longitudinal axis and the filter media component describing a generally cylindrical outer surface which is centred on the longitudinal axis;
 b. a flange extending transverse to the longitudinal axis and protruding beyond the outer surface of the element, a first part of the flange extending a first distance from the outer surface, and a second part of the flange extending a second distance from the outer surface which is less than said first distance;
 c. in which the filter element comprises an alignment component of an alignment assembly, said alignment component being provided by the flange and adapted to cooperate with a further alignment component of the assembly provided by the housing and disposed within the chamber, to facilitate rotational orientation of the filter element within the chamber.

Provision of a flange having an outer periphery including the first and second parts may facilitate location of the filter element in the chamber of the filter assembly in a position in which the longitudinal axis of the filter element is offset relative to a longitudinal axis of the chamber.

The distance may be measured in a generally radial direction from the outer surface, optionally taken relative to the longitudinal axis.

Further features of the filter element of the sixth aspect may be derived from the text set out elsewhere in this document, particularly in or with reference to the filter element of the fifth aspect.

Optional further features of the filter element of the fifth and sixth aspects are as follows.

The flange may form an end cap of the filter element, or may be provided at or adjacent an end cap. The flange may be located at a position which is disposed between the first and second ends. The filter element may comprise first and second such flanges, each of which may form an end cap of the filter element, or may be provided at or adjacent an end cap.

The filter element may be adapted to be located within the housing chamber so that fluid flowing through the chamber from the inlet to the outlet is directed through the filter media component.

According to a seventh aspect of the present disclosure, there is provided a filter element for separating contaminants from a fluid stream, the filter element adapted to be located within a chamber defined by a housing of a filter assembly so that the filter element is in a flow path extending between an inlet of the chamber and an outlet of the chamber, the filter element comprising:
 a. a generally cylindrical outer periphery;
 b. a first end, a second end, a central axis extending between the ends and an internal cavity disposed on the central axis;
 c. a filter media component circumscribing the central axis; and
 d. a first end cap at the first end and a second end cap at the second end, the end caps each comprising an opening which communicates with the internal cavity, the openings being coaxially aligned along the central axis;
 e. in which one of the end caps is arranged non-concentrically with respect to the other end cap, with its opening disposed off-centre in the end cap, and in which said end cap comprises an alignment component of an alignment assembly for rotationally orientating the filter element within the chamber.

Further features of the filter element of the seventh aspect may be derived from the text set out elsewhere in this document, particularly in or with reference to the filter element of the fifth and/or sixth aspects.

In further aspects of the present disclosure, there is provided a separator for separating contaminants from a fluid stream, comprising a filter assembly according to any of the first to fourth aspects.

In further aspects of the present disclosure, there is provided a closed crankcase ventilation (CCV) system comprising a filter assembly according to any of the first to fourth aspects, and which may comprise a separator which incorporates the filter assembly. An engine comprising such a crankcase ventilation system may also be provided.

BRIEF DESCRIPTION OF THE DRAWINGS

Embodiments of the present disclosure will now be described, by way of example only, with reference to the accompanying drawings, in which.

DETAILED DESCRIPTION OF THE PREFERRED EMBODIMENTS

Figure 1:
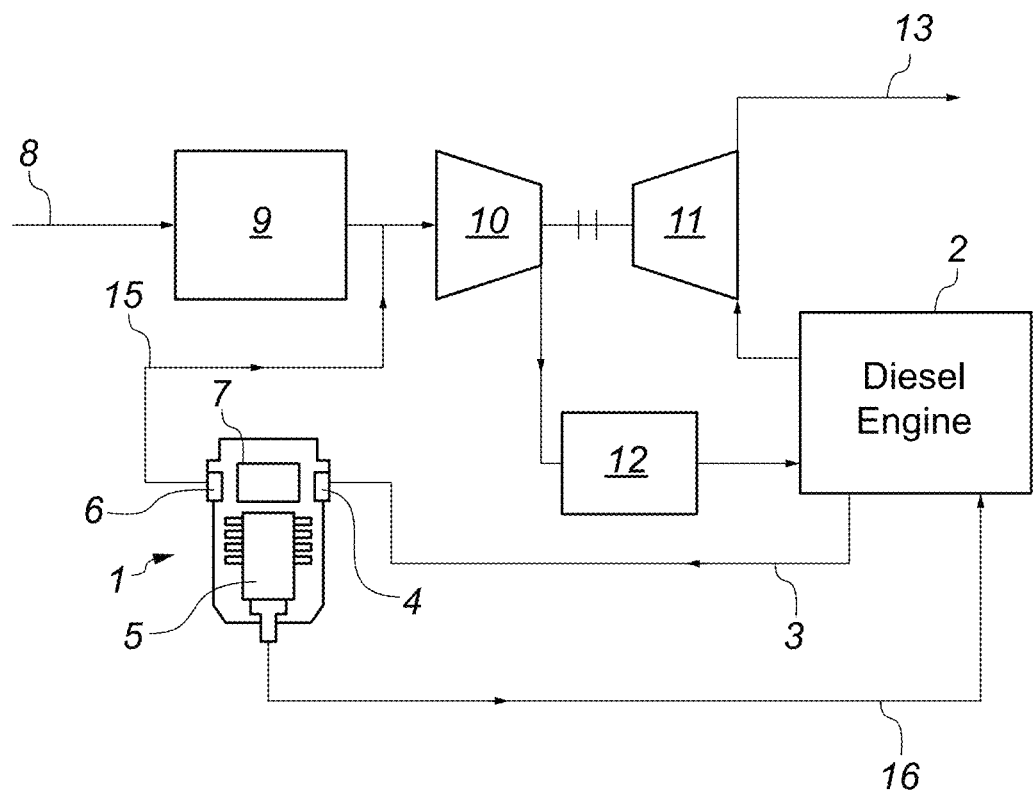
FIG. 1 is a schematic illustration of an engine system including a closed crank ventilation (CCV) system.

FIG. 1 illustrates schematically the arrangement of a CCV system 1 coupled to a diesel engine 2. Blow-by gas from the engine crankcase passes to the CCV system 1 along an inlet duct 3. The CCV system 1 comprises a regulator 4 coupled to the inlet duct 3, a contaminant separator 5, and a filter assembly 7. The regulator 4, separator 5 and filter assembly 7 are arranged in series and are shown combined in FIG. 1.

A pump 6 is provided within the CCV system 1 to increase the pressure drop across the separator 5 and filter assembly 7, thereby increasing the filtering efficiency. Cleaned blow-by gas exits the CCV system 1 through gas outlet 15 and is returned to the engine air intake system. Specifically, the engine air intake system draws in air from outside of the vehicle through an inlet 8, the air then passing through an inlet air filter and silencer 9, a compressor 10 driven by a turbocharger 11 (in turn driven by the engine exhaust 13) and an aftercooler 12 to cool the compressed air before it is supplied to the engine 2. The cleaned blow-by gas passes from the gas outlet 15 to the compressor 10. Oil and other contaminants separated from the blow-by gas are returned to the engine crankcase through an oil drain 16.

A filter assembly and a filter element are described herein, for use in separating contaminants from a fluid stream which includes entrained contaminants as in the CCV system 1 above. A separator comprising such a filter assembly, a CCV system comprising the separator, and an engine comprising the CCV system, are also described. The filter assembly can provide the filter assembly 7 in the CCV system 1 shown in FIG. 1 and described above. A detailed description of the filter assembly, and of a filter element of the filter assembly, will be provided below.

The general structure and operating principles of a CCV system of the type shown in FIG. 1 are well known in the art and set out in detail in publications including International Patent Publication Nos. WO-2014/155054 and WO-2011/095790. The CCV system 1 comprises a multi-stage separator, similar to that shown and described particularly in International Patent Publication No. WO-2013/017832A1. The disclosures of these publications are incorporated herein by this reference. A brief explanation follows of the way in which CCV system 1 is arranged and operates. Reference is made to the prior publications for a more detailed explanation.

Figure 2:
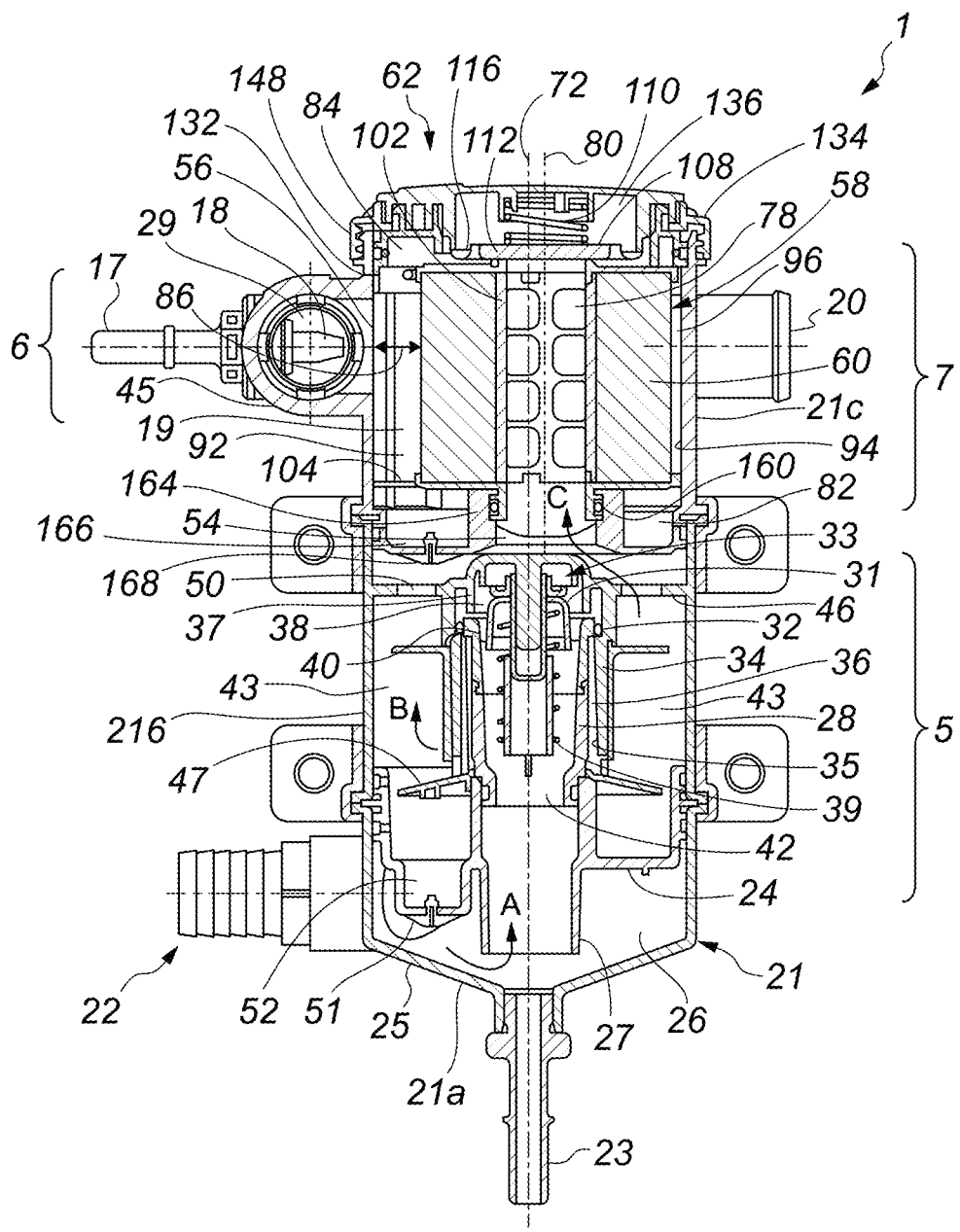
FIG. 2 is a longitudinal cross-sectional side view of the CCV system shown in FIG. 1, comprising a separator, and a filter assembly according to one embodiment, the separator and filter assembly forming different stages of the system.

Referring now to FIG. 2, there is shown a longitudinal cross-sectional side view of parts of the CCV system 1 including the separator 5 (an impactor separator), the filter assembly 7, and the pump 6. The CCV system 1 is a multi-stage separator of a general type which is similar to that disclosed in WO-2013/017832A1. The CCV system 1 includes the separator 5 and filter assembly 7, for separating liquid, aerosol and particulate contaminants from a blow-by gas stream. The respective portions comprising the separator 5, pump 6 and filter assembly 7 are shown in the drawing.

The separator 5, filter assembly 7 and pump 6 are combined in a single unit. The separator 5 has a housing 21 which includes an inlet 22 for receiving gas containing contaminants, and an oil drain outlet 23 which returns separated oil to the engine crankcase via the oil drain 16. The separator 5 includes a cylindrical dividing wall 28 extending lengthways within the separator housing 21, the interior of which forms a first chamber 42.

The housing 21 has a mounting plate 24 provided towards a base section 25 of the housing 21 and above the oil drain outlet 23. An underside of the mounting plate 24 and base section 25 define a lower chamber 26 of the separator 5. The mounting plate 24 has a separator inlet in the form of a vortex finder or inlet tube 27 which opens into the lower chamber 26 at one open end. The dividing wall 28 is mounted on the other, open end of the vortex finder 27. The vortex finder 27 connects the first chamber 42 to the lower chamber 26 to define a continuous passage for the blow-by gases to flow through from inlet 22 to the first chamber 42 via the lower chamber 26 and vortex finder 27. Blow-by gases from the crankcase are directed from the crankcase into the housing 21 via the inlet 22 and into the vortex finder 27 as indicated by the arrow A in FIG. 2.

As is well known in the art, the dividing wall 28 includes at least one aperture, and in the illustrated embodiment comprises an arrangement of spaced apertures (not shown) which are provided towards the upper end of the dividing wall 28 remote from the separator inlet tube 27. The upper end of the dividing wall 28 is closed off by means of a flexible rolling diaphragm 31, which is attached at an upper edge 30 of the dividing wall 28 by means of a sealing arrangement 32 which can be beading or an O-ring seal.

The pump 6 is mounted towards the top of the housing 21 to form the single unit with the separator 5 and filter assembly 7. As mentioned above, the pump 6 serves to generate a region of low gas pressure in order increase the velocity of the gases through the apertures in the dividing wall 28, and to draw contaminated blow-by gases through separator 5 and filter assembly 7. A first inlet 17 to the pump 6 receives a source of pressurised gas, referred to herein as boost gas. The boost gas is provided by the turbocharger 11 or any other source of pressurised gas such as exhaust gas. When used on a turbocharged engine the boost gas may be derived from a source of pressurised gas such as the intake manifold. Alternatively, the pressurised gas could be derived directly from the turbocharger. The first inlet 17 has a nozzle 18, formed as a convergent nozzle, such as a de Laval nozzle, which serves to accelerate the boost gas to a high velocity, for instance between 100 to 500 m/s, with the boost gas typically exceeding Mach 1 at least in the region of the convergent nozzle 18. The pump 6 may take the form of the jet pump, comprising a diffuser, which forms part of a separator disclosed in the International Patent Publication no. WO-2019/211396A1, the disclosure of which is incorporated herein by this reference.

The first inlet 17 is connected to an upper chamber 19 of the housing 21, which, in turn, is connected to a diffuser tube 20. The diffuser tube 20 is generally formed as a cylinder. The side walls of the diffuser tube 20 are not necessarily straight for the whole of their length and may taper outwardly towards the end of the tube remote from nozzle. This tapering assists in controlling the direction of flow and mixing of the combined gas flow.

The upper end of the housing 21 has the diffuser tube 20 mounted thereon. The diffuser tube 20 is mounted to a side of the housing 21 and communicates with the chamber 19 via a connecting conduit 45. A cylindrical tube 34 extends from the underside of the portion of the housing 21 defining the chamber 19. The upper end of the dividing wall 28, including the rolling diaphragm 31, is located within the cylindrical tube 34. The internal wall of the cylindrical tube 34 and the outer wall of the dividing wall 28 define an annular space 36. The internal wall of the cylindrical tube 34 provides an impaction surface 35, the function of which will be described in further detail below. The dividing wall 28 separates the first chamber 42 from the impaction surface 35, which in this embodiment is circular.

An inner circular flange 37 is provided concentrically within the cylindrical tube 34. The rolling diaphragm 31, along with inner circular flange 37, defines a second, upper reference chamber 38. The reference chamber 38 is at atmospheric pressure via an air inlet (not shown) which connects to the outside of the CCV system 1.

The space between cylindrical tube 34 and the housing 21 defines a third chamber 43 which is in fluid communication with the upper chamber 19, in which the filter assembly 17 is located. An annular diffuser plate 46 is provided around the cylindrical tube 34 and separates the upper chamber 19 from the third chamber 43. The annular diffuser plate 46 has a curved aperture or apertures 50 formed therein, which connects the third chamber 43 to the upper chamber 19. The curved aperture 50 extends partially around the annulus of the diffuser plate 46. Blow-by gas, stripped of a portion of the contaminants and oil by passage through the separator 5, flows from the annular space 36 through the third chamber 43 and is directed up to the chamber 19 through the curved aperture 50. Thus, gas flowing from the annular space 36 does not take a direct path into the upper chamber 19, but rather takes a path which is shown by the arrows B and C in FIG. 2. The gas exits the annular space 36 via ports (not shown) in the tube 34.

The rolling diaphragm 31 is supported at a central, radially extending portion by a support assembly 33 which is configured to move up and down in a longitudinal direction (along an actuator axis 56) within the first chamber 42, to cause the diaphragm 31 to sequentially cover and uncover the apertures provided in the upper portion of the dividing wall 28 as it moves up and down. The diaphragm 31 comprises an annular rolling portion 40, alternatively referred to as a rolling convolute, which is the portion that progressively covers and uncovers the apertures as the central portion moves up and down.

A baffle 47 is supported on the mounting plate 24. The baffle 47 is located circumferentially around the periphery of the upper portion of the vortex finder 27. The baffle 47 promotes the upward flow of air within chamber 43 and serves to direct oil separated from the blow-by gas to the oil outlet 23 via a check valve 51. Oil separated from the gas therefore flows down the baffle 47 into a sump 52 formed in the mounting plate 24, and back to the oil outlet 23 through the check valve 51, which opens when the pressure in the lower chamber 26 is the same or slightly above that in the sump 52. A number of check valves 51 can be provided although only one is shown in FIG. 2.

Gas is drawn into the separator inlet tube 27 generally along the path indicated by arrow A in FIG. 2 through the lower chamber 26. This section acts as a cyclonic pre-separator and the vortex finder 27 at this point defines the centre of a vortex of the gas. Liquid oil and large particles are separated from the gas at this stage and flow to the oil drain outlet 23. The blow-by gas then passes upwards through the vortex finder 27, into the first chamber 42 which is closed at its upper end by diaphragm 31. The blow-by gas passes through one or more of the apertures 29 and is incident upon the annular impaction surface 35. Oil and other contaminants separated from the blow-by gas at the impaction surface 35 flow under gravity to oil drain outlet 23 via the sloping baffle 47, sump 52 and check valve 51. Oil from the oil drain outlet 23 is returned to the crankcase.

The high-speed boost gas jet from the first inlet 17 passes into a chamber 29 which communicates with the chamber 19 via the conduit 45. The high velocity boost gas jet causes a region of reduced pressure in the vicinity of the nozzle 18. Pressure is reduced by up to 250 mbar relative to external atmospheric pressure. This reduction in pressure allows cleaned blow-by gas from the separator 5 to be drawn into chamber 19 and so through the filter assembly 7, generally along the path of arrows B and C in FIG. 2. The blow-by gas flow is entrained and accelerated by the boost gas, intermixing with the boost gas and accelerating to approach the speed of the boost gas. A terminal velocity will be reached at the outlet of the diffuser 20 based on total flow rate.

The separator 5 may be considered to be a variable impactor separator as it is intended to respond to differences between the blow-by gas inlet pressure and the outlet pressure to increase the separation efficiency.

As mentioned above, the reference chamber 38 is kept at atmospheric pressure by an air inlet which connects to the outside of the CCV system 1. The first chamber 42 and lower chamber 26 are therefore at substantially the same pressure as the engine crankcase.

The blow-by gas passes into the annular space 36 through one or more of the apertures. The number of apertures open will vary as the rolling diaphragm 31 rolls up and down under control of the support assembly 33 to cover and uncover the apertures. The size and number of apertures (which may take the form of slots) determines the minimum differential pressure drop across the separator 5. As the contaminated blow-by gas travels through the apertures, separation of oil particles due to radial acceleration of the particles occurs. The flow of the blow-by gas is through the apertures and impaction and separation of oil particles due to radial acceleration in making a 180° turn occurs both on the diaphragm 31 face and as the blow-by gas hits the impaction surface 35. The impaction surface 35 may be covered with a material opposite the apertures to reduce the tendency of oil droplets and other contaminants to bounce off the impaction surface 35. The media covering the impaction surface serves to reduce re-entrainment of the contaminants, acting as a coalescer.

The pump 6 is used to overcome the pressure drop across the separator 5. Under various engine loads, speed or engine braking conditions both the vacuum generated by the pump 6, and the volume of blow-by gas passing through the separator 5 changes. To maintain an acceptable crankcase pressure according to the variable vacuum conditions generated by the pump 6, the diaphragm 31 moves up and down to cover and uncover the apertures.

The pump 6 is powered with air from the engine turbo and thus creates pressure lift. The developed pressure lift is used to enhance the performance of the impactor 5. By subjecting the upper chamber 19 to vacuum, the pressure in the third chamber 43, and so the first chamber 42, will consequentially be reduced. The rolling diaphragm 31 responds to cover or close the apertures, and whilst the rolling diaphragm 31 is referenced to atmosphere, the pressure in the first chamber 42 will be stabilised relative to atmosphere. Similarly, if the vacuum is reduced in the third chamber 43, the pressure in the first chamber 42 will increase and the diaphragm 31 will respond to open up the apertures. This relationship then maintains near atmospheric pressure in the first chamber 42 and creates a pressure drop across the impactor 5. This pressure drop is directly related to the separation efficiency of the impactor 5. When the velocity of the gas is accelerated above 100 m/s the fractional efficiency of the impactor 5 is improved.

Thus, a low flow rate through the first chamber 42 or a high vacuum in the third chamber 43 tends to close the diaphragm 31 over the apertures thus decreasing the aperture open area/increasing the pressure differential across the separator 5, and thus preventing excess negative pressures in the engine crankcase. Conversely, a high flow rate through the first chamber 42 or a low vacuum in the third chamber 43 tends to cause the diaphragm to open up more of the apertures thus increasing the aperture open area/decreasing the pressure differential across the separator 5, and preventing excess positive pressures in the engine crankcase.

The pressure differential of the separator 5 is adjusted and crankcase pressure can be regulated precisely according to atmospheric pressure on the opposing side of the rolling diaphragm 31 or with the specification of a regulator spring 39 which acts on the support assembly 33. The interaction between the apertures and the rolling diaphragm 31 can maintain relative atmospheric pressure control to the upstream of the impaction surface 35.

The filter assembly 7 will now be described in more detail. The housing 21 of the CCV system 1 comprises first, second and third housing parts 21*a*, 21*b* and 21*c*, which are coupled together end-to-end as shown in FIG. 2. The housing part 21*c* forms a housing of the filter assembly 7 and defines the chamber 19 described above. The housing part 21*c* also comprises an opening which communicates with the chamber, the opening indicated by reference numeral 52 and shown in the enlarged plan view of FIG. 3. The chamber 19 comprises an inlet 54 arranged to receive a fluid stream including entrained contaminants, and an outlet 56 (FIG. 2) through which the fluid stream can exit the chamber 19 following removal of contaminants.

The filter assembly 7 comprises a filter element 58 which is locatable within the chamber 19 in a flow path extending between the inlet 54 and the outlet 56. The filter element 58 comprises a filter media component 60, and the filter element is locatable within the chamber 19 in the flow path so that fluid flowing from the inlet 54 to the outlet 56 is directed through the filter media component.

Figure 3:
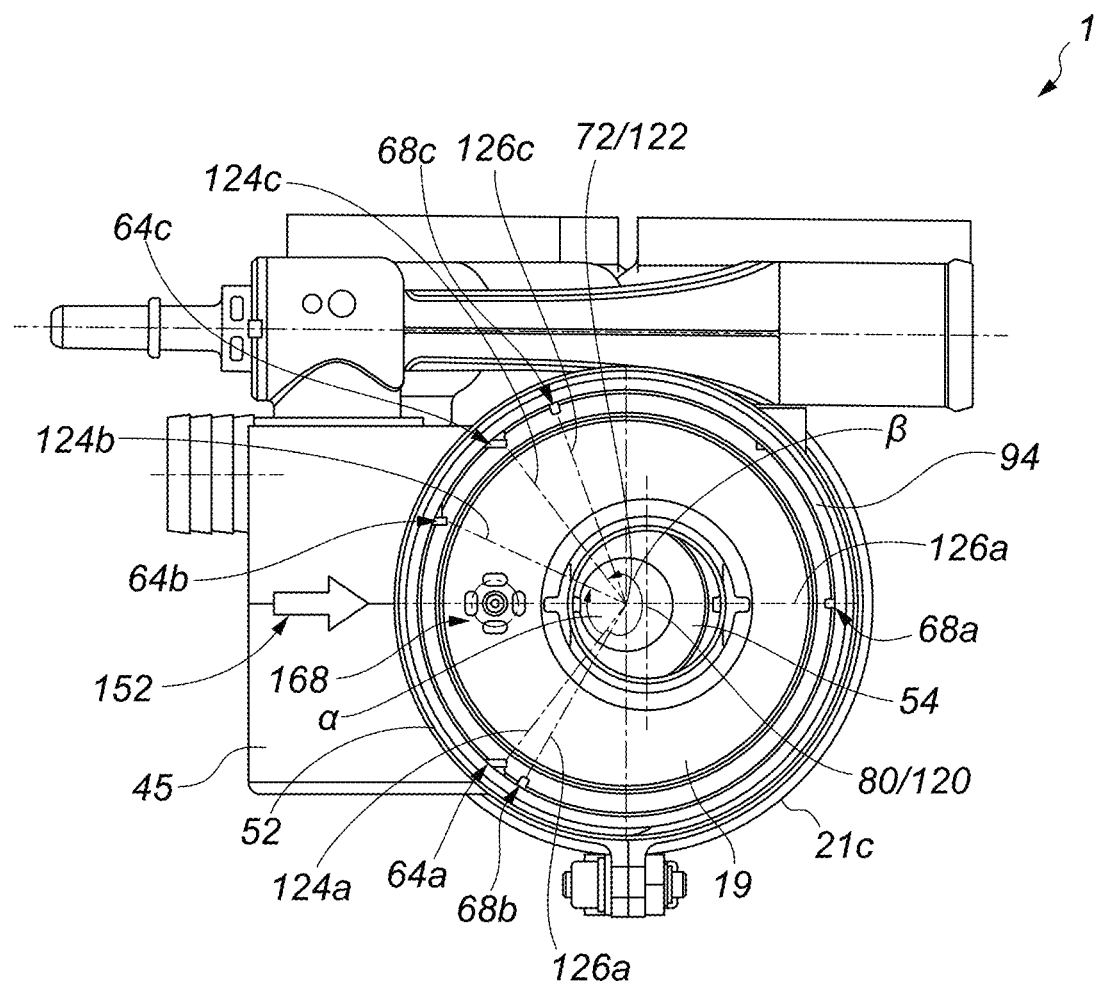
FIG. 3 is an enlarged plan view of part of the CCV system shown in FIG. 2, illustrating a housing of the filter assembly with a cover released from the housing, and a filter element of the assembly removed from a chamber defined by the housing.

The housing opening 52 is dimensioned so that the filter element 58 can pass through the opening for location in the chamber 19. The filter assembly 7 comprises a cover or lid 62, which is shown in FIG. 2, and which can be coupled to the housing portion 21*c* to close the opening 52 and secure the filter element 58 within the chamber 19. The plan view of FIG. 3 shows the CCV system 1 with the cover 62 released from the housing portion 21*c*, and the filter element 58 removed from the chamber 19. The filter element 58 is shown separately in the perspective views of FIGS. 4 and 5, which are taken from above and from below, respectively. The cover 62 is also shown separately in the further enlarged perspective views of FIGS. 6 and 7, taken from above and below, respectively.

The filter assembly 7 comprises at least one first alignment assembly having a first alignment component 64*a* provided by the housing portion 21*c* and disposed within the chamber 19, and a second alignment component 66*a* provided by the filter element 58. The first and second alignment components 64*a* and 66*a* cooperate to rotationally orient the filter element 58 within the chamber 19.

The filter assembly 7 also comprises at least one second alignment assembly having a first alignment component 68*a* provided by the housing portion 21*c* and disposed within the chamber 19, and a second alignment component 70*a* provided by the cover. The first and second alignment components 68*a* and 70*a* cooperate to rotationally orient the cover 62 relative to the housing portion 21*c*, and so to the filter element 58 when it is located within the chamber 19.

The filter assembly 7 prevents insertion of an incorrect filter element into the chamber 19, which could otherwise lead to impaired or incorrect performance, and/or may prevent rotational orientation of an incorrect element within the chamber. In particular, the first and second alignment components 64*a* and 66*a* of the first alignment assembly cooperate so that insertion of an incorrect element into the chamber 19 is prevented, or so that rotational orientation of the incorrect element within the chamber is prevented. This is because an incorrect element will not carry the required alignment component and may then be prevented from being located within the chamber (or being correctly rotationally oriented) by the alignment component 64*a* that is provided by the housing portion 21*c*.

The chamber 19 has a longitudinal axis 72. The filter element 58 has a first end 74, a second opposite end 76, and a passage 78 which extends along the element between the first and second ends. The filter media component 60 extends around the passage 78, as best shown in FIG. 2. The filter element also has a longitudinal axis 80, which is shown in FIGS. 2 and 3. The outlet 56 of the chamber 19 is spaced from its longitudinal axis 72, and extends generally transverse to the axis, as shown in FIG. 2. The outlet 56 extends from a side of the chamber and is disposed between first and second ends 82 and 84 of the chamber. It will be understood however that the outlet may be provided in an alternative location, including in the cover 62 itself.

The filter element 58 is disposed in an offset location within the chamber 19, and in the illustrated embodiment is eccentrically located within the chamber. The filter element 58 is therefore offset relevant to the chamber outlet 56, and in particular is laterally or radially offset. The inlet 54 of the chamber 19 is also offset (or eccentrically located) relative to the chamber axis 72 and aligned with the internal passage 78. The first and second alignment components 64*a* and 66*a* of the first alignment assembly cooperate to rotationally orient the filter element 58 within the chamber 19 so that a desired spacing 86 is provided between the chamber outlet 56 and an outer surface 88 described by a part of the filter media component facing generally towards the outlet, the part indicated generally by numeral 90 in FIG. 4.

As can be seen from FIG. 2, the filter element 58 and the housing part 21*c* are arranged so that, when the filter element is located within the chamber 19, a generally annular space 92 exists between the outer surface 88 of the filter element 58 and an inner surface of a wall 94 of the housing part 21*c*. The eccentric location of the filter element 58 within the chamber 19 is such that a width of the annular space 92 varies around a perimeter of the filter element. Specifically, the distance or spacing 86 between the outer surface 88 and the chamber outlet 56 is greater than a distance or spacing 96 between the outer surface 88 and the housing wall 94 at a location that is spaced 180° around a perimeter of the chamber 19 from the outlet 56. The increased spacing 86 at the outlet 56 may have the benefit of reducing a likelihood of contaminants on the external surface 88 of the filter media component 60 becoming re-entrained in a flow of 'clean' fluid passing around the filter element in the annular space 92 towards the outlet 56. In particular, the spacing in a low-pressure zone which exists in the vicinity of the outlet 56 is increased, to reduce the likelihood of contaminants becoming re-entrained.

The eccentric location of the filter element 58 within the chamber 19 is such that the filter element is non-coaxially located within the chamber. This can best be seen in FIGS.

2 and 3 by the lateral spacing between the chamber and filter element axis 72 and 80. This is achieved by the cooperation between the first and second alignment components 64a and 66a of the first alignment assembly.

Figure 4:
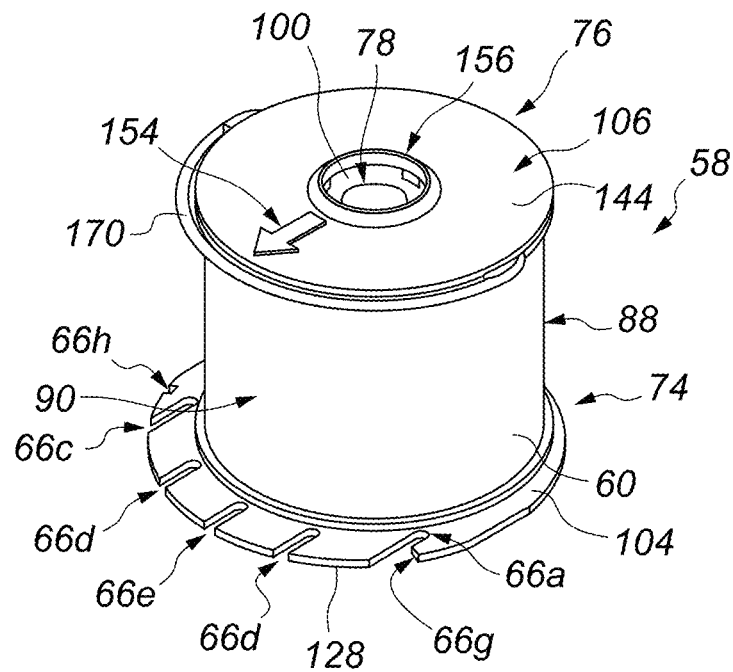
FIG. 4 is an enlarged perspective view of the filter element forming part of the filter assembly shown in FIG. 2, taken from above.
Figure 5:
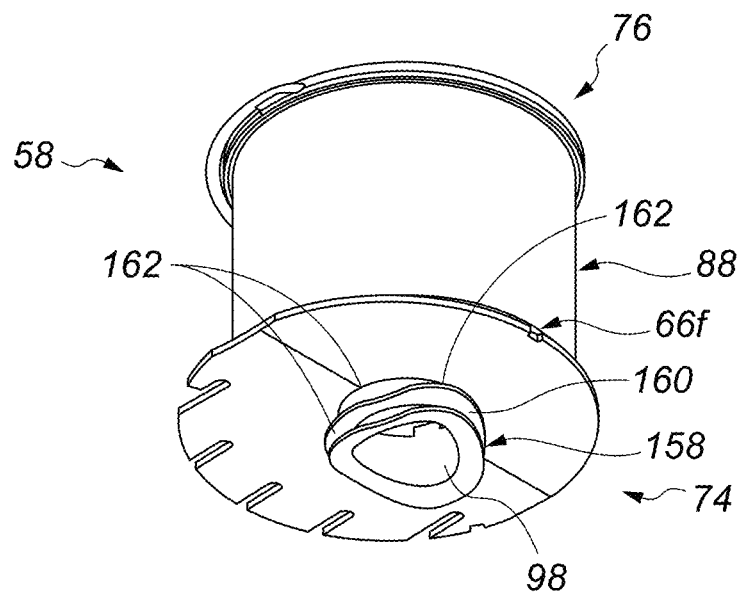
FIG. 5 is a perspective view of the filter element taken from below.
Figure 6:
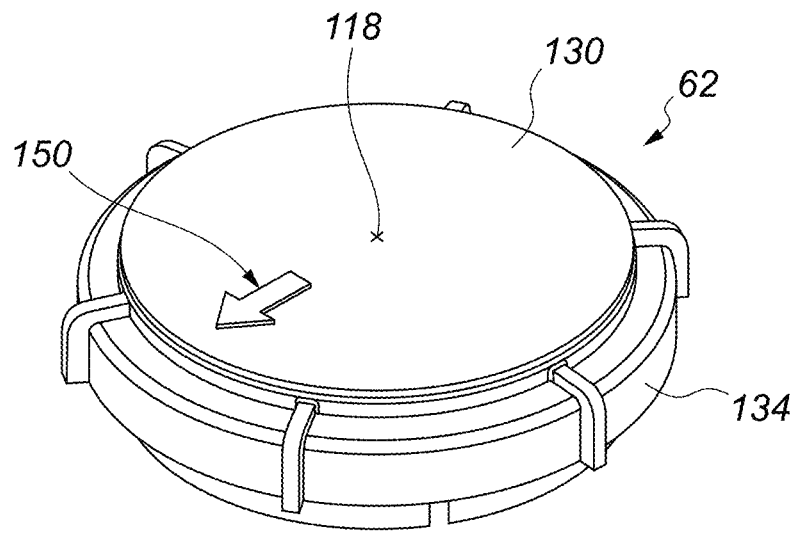
FIG. 6 is an enlarged perspective view of the cover forming part of the filter assembly shown in FIG. 2, taken from above.

As best shown in FIGS. 4 and 5, the filter element to passage 78 has a first opening 98 at the first end 74, and a second opening 100 at the second end 76. In this way, the passage 78 extends along an entire length of the filter element 58 between its first and second ends 74 and 76. It is conceivable however that the passage may extend only part-way along the length of the filter element 58 from one of the first and second ends towards the other one of the ends, most particularly from the first end 74 towards the second end 76. One of the ends 74 and 76, most particularly the second end 76, may therefore be closed. The inlet 54 of the chamber 19 is offset (or eccentrically located) relative to the chamber axis 72 and aligned with the filter axis 80 and its first opening 98.

In the illustrated embodiment, the first and second alignment components 68a and 70a of the second alignment assembly cooperate to rotationally orient the cover 62 relative to the housing portion 21c, and so to the filter element 58 when it is located in the chamber 19. In this way, the cover 62 closes the second opening 100 of the passage 78 at the second end 76 of the filter element 58, which is disposed adjacent or proximate to the cover when the cover is coupled to the housing 21c. This facilitates direction of the fluid stream carrying residual entrained contaminants through the filter media component 60. Specifically, and referring back to FIG. 2, the fluid stream exiting the separator 5, in the direction of the arrow B, passes from the chamber 43, through the aperture 50 and into the filter element passage 78, as indicated by the arrow C in FIG. 2. As the second opening 100 is closed by the cover 62, the fluid stream is forced radially outwardly through the filter media component 60 and into the annular space 92 surrounding the filter element 58.

The filter media component 60 is of a conventional construction, suitable materials and methods of forming the filter media component being well known in the art and disclosed for example in the prior publications mentioned elsewhere in this document. The filter element includes a perforated core tube 102 which is circumscribed by the filter media component 60, the media component being secured between first and second end caps 104 and 106 of the filter element 58, which define the first and second ends 74 and 76, respectively. The filter media component 60 is typically secured to the end caps 104 and 106 by "potting" the material forming the filter media component using a suitable adhesive.

Figure 7:
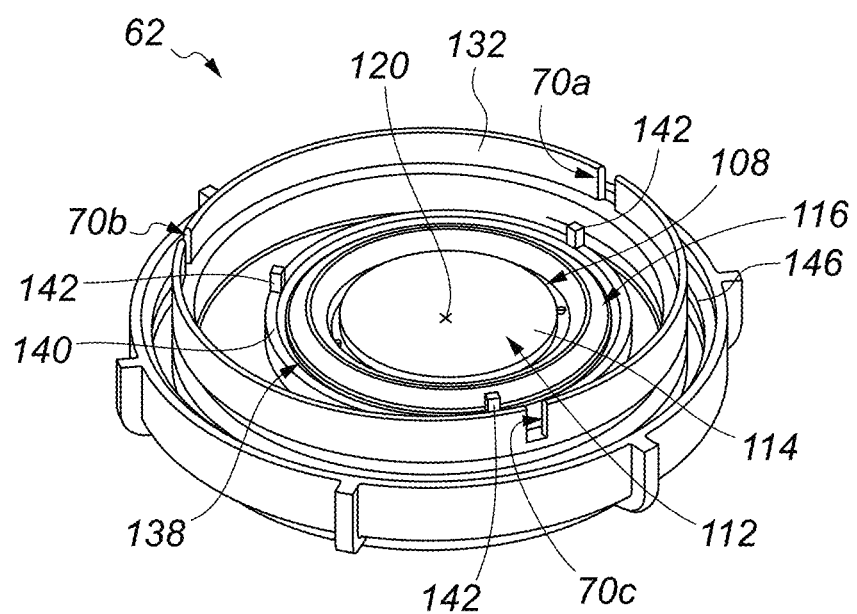
FIG. 7 is a perspective view of the cover taken from below.

The cover 62 comprises a pressure relief valve, which is shown in FIGS. 2 and 7 and indicated generally by reference numeral 108. The pressure relief valve 108 closes the second opening 100 at the second end 76 of the filter element 58, which is disposed adjacent the cover 62 when the filter element 58 is located in the chamber 19 and the cover coupled to the housing part 21c. The pressure relief valve 108 is biased towards a closed position, which is shown in FIG. 2, suitably by a biasing element such as a compression spring 110. Typically, the pressure relief valve 108 is provided in the general form of a diaphragm. The relief valve 108 comprises a sealing part 112 defining a sealing surface 114 adapted to sealingly abut the filter element 58, and a flexible part 116 in the form of a diaphragm convolute, which facilitates movement of the sealing part 112 towards and away from the filter element.

The pressure relief valve 108 is moveable to an open position when the pressure of fluid within the filter element passage 78 reaches a predetermined level. This may occur when the filter media component 60 becomes clogged with contaminants, leading to an increased pressure drop across the media component. This increased pressure drop results in a raised backpressure in the passage 78, which forces the sealing part 112 of the relief valve 108 towards its open position, against the biasing action of the spring 110. This allows fluid to bypass the filter element 58 along a bypass flow path from the second opening 100 of the filter element to the outlet 56. It will be understood that, in this scenario, the filter element 58 requires replacing with a fresh element so that effective filtering of contaminants may continue.

As can be seen from FIGS. 2 and 7, the pressure relief valve 108 is eccentrically located within the cover 62. The cover 62 has a centre 118 and the pressure relief valve has a centre 120, the centre of the valve being offset relative to the centre of the cover. As can be seen particularly in FIG. 2, the centre 120 of the valve 108 is substantially aligned with the longitudinal axis 80 of the filter element 58, and the centre 118 of the cover 62 is substantially aligned with a centre 122 of the chamber 19 (FIG. 3), and so disposed on the longitudinal axis 72 of the chamber, when the cover 62 is coupled to the housing part 21c. In this way, location of an incorrect filter element in the chamber 19 can have the result that the pressure relief valve 108 cannot correctly engage the element, when the cover 62 is coupled to the housing and the valve 108 biased to its closed position. This may be achieved by appropriate dimensioning of the sealing part 112 of the valve 108, so that it does not properly overlap an adjacent opening in the incorrect filter element, resulting in a bypass flow path existing from the central passage of the incorrect filter element through its upper opening.

The first and second alignment assemblies, and the location of the filter element 58 in the chamber 19, will now be described in more detail. The first and second alignment components 64a and 66a of the first alignment assembly cooperate to define a single permissible rotational orientation of the filter element 58 within the chamber 19. This is achieved by appropriate positioning of the component 64a on the housing (in the chamber 19), and of the component 66a on the filter element 58. It is desirable to provide such a single permissible rotational orientation of the filter element 58 in order to ensure an eccentric positioning of the element within the chamber 19, so that the spacing 86 is provided between the part 90 of the filter element outer surface 88 and the outlet 56, and so that the element is in alignment with the inlet 54.

In a similar way, the first and second alignment components 68a and 70a of the second alignment assembly cooperate to define a single permissible rotational orientation of the cover 62 relative to the housing part 21c. This is achieved by appropriate positioning of the component 68a on the housing part 21c (in the chamber 19), and of the alignment component 70a on the cover 62. It is desirable to provide such a single permissible rotational orientation in order to ensure a desired eccentric positioning of the valve member 108 carried by the cover 62, so that it can sealingly abut the correct filter element 58 when it is located in the housing chamber 19.

In the illustrated embodiment, the first alignment assembly comprises a plurality of first alignment components 64a, 64b and 64c in the housing part 21c, and a corresponding plurality of second alignment components 66a, 66b and 66c provided by the filter element 58. The first alignment components 64a, 64b and 64c are arranged to cooperate with the second alignment component 66a, 66b and 66c having the corresponding suffix (a, b or c). Optional further second alignment components 66d and 66e are provided by the filter element 58, for cooperating with corresponding first alignment components (not shown) that can be provided by the housing part 21c.

The first alignment components 64a to c provided by the housing part 21c are formed on the wall 94 of the housing part 21a and are spaced apart around a perimeter of the chamber 19. As can best be seen from FIG. 3, the first alignment components 64a to c are non-equidistantly spaced apart around the perimeter so that an angle between one alignment component and an adjacent component, taken in a first direction around the perimeter, is different to an angle between the one alignment component and an adjacent component, taken in a second direction around the perimeter. This arrangement provides a single rotational orientation of the filter element 58 relative to the housing part 21c. For example, and considering the first alignment component 64a, an angle α between the first component 64a and the adjacent first component 64b, travelling in a clockwise direction, is less than an angle β between the component 64a and the other adjacent first component 64c, travelling in an anti-clockwise (or counter-clockwise) direction. As can be seen from FIG. 3, the first alignment components 64a to c are each substantially disposed on a line which is transverse to a respective radius 124a to c of the chamber 19. As will be described below, this ensures alignment with the respective second alignment components 66a to c defined by the filter element 58.

The second alignment assembly similarly comprises a plurality of first alignment components 68a to c provided by the housing part 21c, on its wall 94. A corresponding plurality of second alignment components 70a to c are provided by the cover 62. The first alignment components 68a to c of the second alignment assembly provided by the housing part 21c are also non-equidistantly spaced apart around the perimeter of the chamber 19, as can be seen in FIG. 3. An angle between the alignment component 68a and the component 68b is therefore different to the angle between the component 68a and the component 68c. This arrangement provides a single rotational orientation of the cover 62 relative to the housing part 21c. The alignment components 68a to 68c are each disposed generally parallel to a respective radius 126a to c of the chamber 19.

The first alignment components 68a to c of the second alignment assembly, which cooperate with the second alignment components 70a to c provided by the cover 62, also cooperate with the filter element 58. Specifically, the first alignment components 68a, b and c cooperate with respective second alignment components 66f, g and h provided by the filter element 58. The first alignment components 68a to c of the housing part 21c therefore effectively form first alignment components of both the first and second alignment assemblies, serving both to rotationally orient the filter element 58 within the chamber 19, and the cover 62 relative to the housing 21c. This is achieved by arranging the first alignment components 68a to c so that they extend along the length of the housing chamber 19 from its first end 82 to its second end 84.

The first alignment components 64a to c and 68a to c, provided by the housing part 21c, each extend radially inwardly from the housing wall 94 into the chamber 19. The second alignment components 66a to h defined by the filter element 58 are each provided in a flange which forms the first end cap 104 of the filter element and extend inwardly from a perimeter or periphery 128 of the flange 104. The first alignment components 64a to c and 68a to c are each provided as male components and are arranged to be received within the second alignment components 66a to h, which define female components. Suitably, the male and female components are arranged in a sliding fit, the male components 64a to c and 68a to c defining a protrusion such as a key, rib, tongue or the like. The female alignment components 66a to h each define a corresponding keyway, slot, channel, recess, passage or the like shaped to receive the male protrusion. Fitting of the filter element 58 into the chamber 19 requires alignment between the male components 64a to c and 68a to c, and the respective female components 66a to h. The filter element 58 can then be translated relative to the housing part 21c, for location in the chamber 19 as shown in FIG. 2.

The first alignment components 68a, 68b and 68c, extending along the length of the chamber 19, effectively form tall keys which can be aligned with the respective keyways 66f, 66g and 66h provided on the filter element flange 104, when the filter element 58 is inserted into the chamber 19. This facilitates correct rotational orientation of the filter element 58 relative to the housing 21c during initial insertion of the element into the chamber 19. Once the keys 68a to c and the keyways 66f to h are correctly aligned, the filter element 58 can be translated into the chamber 19. This will ensure appropriate alignment between the housing keys 64a to c, which extend only partway along the length of the chamber 19 from the first end 82 towards the second end 84, and the respective keyways 66a to c on the filter element flange 104. The combinations of the respective keys and keyways provided by the housing part 21c and the filter element 58 provide a specified rotational orientation and secure location of the filter element within the chamber 19.

The cover 62 comprises an outer lid portion 130, and an inner wall portion 132 extending from the lid portion. The cover 62 also comprises a radially outer collar 134, which is rotatably mounted on the lid portion 130. The lid 62 is generally circular in shape, and the inner wall portion 132 is also generally annular and extends in a direction towards the chamber 19, when the cover is coupled to the housing part 21c. The alignment components 70a to c provided by the cover 62 are spaced apart around a perimeter of the cover and are suitably provided by the inner wall portion 132. In a corresponding fashion to the first alignment components 68a to c provided by the housing part 21c, the second alignment components 70a to c are non-equidistantly spaced apart around the inner wall portion 132.

The second alignment components 70a to c are female components, generally taking the form of keyways or slots which are substantially aligned with respective radii of the cover 62 (not shown), extending from the cover centre 118. The cover 62 includes a recess 136 having an open end 138 which receives the sealing part 112 of the pressure relief valve 108. The spring 110 is mounted within the recess 136 to urge the sealing part 112 towards the filter element 58, so that its sealing surface 114 is brought into abutment with the filter element. The cover 62 includes a further inner wall portion 140 which is located radially inwardly of the wall portion 132, and which is located in an eccentric position relative to the cover centre 118. The pressure relief valve 108 is located radially inwardly of the further wall portion 140 and is secured to the cover 62 by a suitable clamping arrangement which engages the convolute 116. Abutments in the form of prongs 142 are provided on the further wall portion 140 and abut an upper surface 144 of the filter element second end cap 106, when the filter element 58 is located in the chamber 19. This ensures a stand-off between the cover 62 and the filter element 58 and secures the filter element against axial movement within the chamber 19 when the filter element is seated in the chamber, and the cap 62 is secured to the housing part 21c. The stand-off also enables the sealing part 112 of the valve 108 to move to its open position, out of sealing contact with the filter element 58, when the pressure drop across the filter media component 60 reaches the predetermined level.

The cover 62, in particular its outer collar 134, comprises an engagement feature in the form of a thread 146, which can engage a corresponding engagement feature in the form of a thread 148 provided on the housing part 21c adjacent its opening 52. As discussed above, the outer collar 134 is rotatable relative to the lid portion 130, which enables engagement between the thread 146 on the cap 62, and the thread 148 on the housing part 21c, for securing the lid 62 to the housing. The first alignment keys 68a to c on the housing part 21c, and the second alignment keyways 78c provided by the cap 62, are arranged such that they can be aligned and engaged prior to the threads 146 and 148 being brought into engagement, or alternatively at the same time as engagement between the threads occurs. This facilitates correct alignment of the cover 62 with the housing part 21c, and so of the pressure relief valve 108 with the filter element passage 78. An alignment arrow 150 is provided on the cap 62, which aligns with a corresponding arrow 152 on the housing part 21c, to assist with correct alignment. A corresponding alignment arrow 154 is provided on the filter element top cap 106, which also serves for alignment with the arrow 152 on the housing part 21c.

Returning to FIG. 4, the filter element 58 carries a sealing member 156 on its top cap 106, in the form of an annular collar which stands out from the cap surface 144. The collar 156 sealingly abuts the sealing part 112 of the pressure release valve 108, when it is biased towards its closed position shown in FIG. 2. Suitably, the pressure relief valve 108 is a diaphragm, as discussed above, and may be of a suitable flexible material such as an elastomeric material, which provides an effective seal. The end caps 104 and 106 of the filter element 58 are suitably formed of a polymeric material, and the collar 156 will typically formed of the same material. However, it may be desirable to provide the collar 156 of a softer material, such as an elastomeric material, or to provide a seal of a softer e.g. elastomeric material on the collar 156.

The first end cap 104 of the filter element 58 also comprises a sealing member, for sealing the element relative to the housing part 21c. In the illustrated embodiment, the first end cap 104 comprises an annular body 158 which defines the opening 98 into the internal passage 78, with a sealing member 160 provided along a radially outer surface of the annular body 158. The sealing member 160 is suitably of an elastomeric material, and has a repeating, undulating, non-planar geometry circumscribing the outer perimeter of the body 158. The undulating geometry of the sealing member 160 has a repeating axial amplitude around the outer diameter of the body 158, including multiple lobes 162. Reference is made to the filter element comprising such an annular body and sealing member disclosed in US patent publication number US-2012/0181224A1, the disclosure of which is incorporated herein. Provision of such an annular body 158 and sealing member 160 further helps to ensure against insertion of an incorrect filter element into the chamber 19. Specifically, a filter element that does not carry the annular body and sealing member would be incapable of correctly sealing with an annular wall 164 of the housing which defines the inlet 54, and which has a corresponding undulating shape.

As described above, during use fluid containing entrained contaminants passes from the internal passage 78 and through the filter media component 60 of the filter element 58. Liquid contaminants can collect in a sump 166 defined by the housing part 21c and can be discharged from the sump through a check valve 168 when the engine is keyed-off. Such liquid contaminants eventually reach the lower check valve 51, for discharge into the sump and from the CCV system 1 through the outlet 23.

When the filter element 58 requires replacing, either because it has become clogged or at the end of a prescribed operational period, the cap 62 can be released from the housing part 21c by rotating the outer collar 134 to disengage the threads 146 and 148. The cover 62 can then be removed, providing access into the chamber 19. A handle or rim part 170 on the top cap 106 facilitates gripping of the filter element 58, which can then be translated out of the chamber 19. A replacement filter element 58 can then be appropriately rotationally oriented relative to the chamber 19 and inserted, as described above. The cap 62 can then be reconnected and the CCV system 1 is ready for further use.

A filter element for separating contaminants from a fluid stream is also provided as described above in relation to the CCV system 1 and filter assembly 5, which incorporates the filter element 58. Features of the filter element can therefore be derived from the text set out above. Further features of the filter element will now be described.

Figure 8:
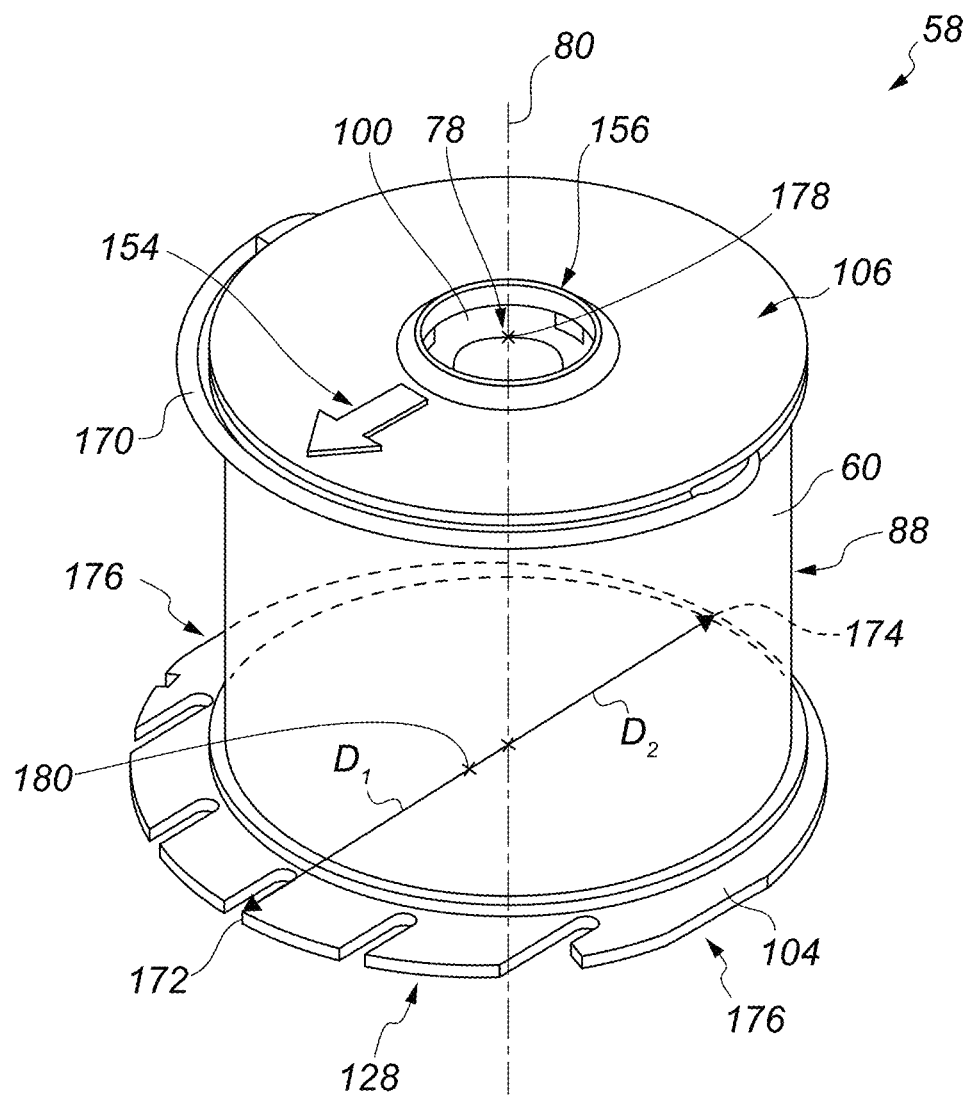
FIG. 8 is a view of the filter element which corresponds to FIG. 4 but drawn to a larger scale.

FIG. 8 will now be referred to, which is perspective view of the filter element 58 that corresponds to FIG. 1 but drawn to a larger scale. As discussed above, the filter element 58 comprises a first end cap in the form of a flange 104. The flange 104 extends transverse to the longitudinal axis 80 of the filter element 58 and is suitably disposed substantially perpendicular to the axis. The flange 104 describes an outermost perimeter 128 of the filter element. The second alignment components 66a to h provided by the flange 104 are spaced around the perimeter in a similar fashion to the first alignment components 64a to c and 68a to c of the housing part 21c.

A first part 172 of the perimeter 128 is disposed a first distance $D_1$ from the longitudinal axis 80, taken in a direction which is perpendicular to the axis. A second part 174 of the perimeter 128 defined by the flange 104 is disposed a second distance $D_2$ from the longitudinal axis 80, again taken in the perpendicular direction, and which is less than the first distance $D_1$. This provides the required eccentric location of the filter element 58 within the housing chamber 19, with the desired spacing 86 relative to the outlet 56 discussed in detail above. Specifically, the first part 172 of the perimeter 128 defined by the flange 104, extending to the greater distance $D_1$, effectively spaces the filter element axis 80 from the chamber axis 72 as shown in FIG. 2 and described above. This is because the part of the flange 104 describing the first perimeter part 172 extends a greater distance from the outer surface 88 of the filter element 58 than the part of the flange describing the second part 174 of the perimeter. The flange 104 is dimensioned to be a relatively close fit within the chamber 19, with the housing wall 94, at least in the region of the first and second perimeter parts 172 and 174. Contact between the perimeter parts 172 and 174 with the housing wall 94 therefore serves to position the filter element 58 in its eccentric location shown in FIG. 2 and described above.

The second end cap 106 is generally circular. The first end cap defined by the flange 104 is similarly generally circular, save for flats 176 which are spaced across a diameter of the flange 104, and disposed around 90° around the perimeter from the first and second perimeter parts 172 and 174. These flats 176 may serve as an aid for rotational orientation of the filter element 58 during insertion into the chamber 19, and/or may assist insertion. The first end cap defined by the flange 104 is arranged non-concentrically with respect to the second end cap 106, so that the opening 98 defined by the flange 104 (FIG. 5) is off-centre in the end cap. A centre 178 of the opening 100 in the second end cap 106 is therefore spaced laterally relative to a centre 180 of the end cap defined by the flange 104. The centre 178 of the second end cap 106 is therefore generally disposed on the longitudinal axis 80 of the filter element 58.

As the end cap defined by the flange 104 is generally circular, and the filter media component 60 generally cylindrical, this has the effect that a distance between the perimeter 128 defined by the flange and the longitudinal axis 80 progressively changes in a direction around the circumference of the flange 104, with the exception of the two flats 176. Correspondingly, a distance between the outer surface 88 and the perimeter 128 also varies around the circumference of the flange 104, with the exception of the flats 176. It will be understood however that eccentric positioning of the filter element 58 within the chamber 19 may be achieved without requiring such progressive variation, and/or without requiring a generally circular flange. A similar effect could be achieved by employing an end cap which includes a generally circular portion overlapping the filter media component 60, with a flange extending from the circular portion and having sections which are spaced apart around a circumference of the flange, and which extend to different distances from the longitudinal axis and outer surface. For example, a series of protrusions such as tabs may be provided extending from the circular portion of the end cap and spaced apart around its circumference.

A filter element 58 is disclosed in which the first end cap is provided by the flange 104. It will be understood however that a conventional type end cap may be provided, similar to the end cap 106, and an annular flange may be provided separately and which is located along a length of the filter element 58 between the first and second circular end caps 104 and 106. Similarly, more than one flange may be provided if desired. Indeed, it may be desirable to provide the second end cap 106 with a similar flange to that shown in FIGS. 4 and 8 and indicated by numeral 104.

Various modifications may be made to the foregoing without departing from the sprit or scope of the present invention.

For example, the housing, filter element and cover may comprise an arrangement of different types of alignment components. Male and female alignment components are shown in the drawings and described above. One optional alternative would be for the housing to include at least one male and at least one female component, for engaging corresponding female and male components on the filter element. A similar arrangement of male and female alignment components may be provided between the housing and the cover.

The invention claimed is:

1. A filter assembly for filtering contaminants from a fluid stream, the filter assembly comprising:
 a. a housing defining a chamber and an opening which communicates with the chamber, the chamber having an inlet arranged to receive a fluid stream including entrained contaminants, and an outlet through which the fluid stream can exit the chamber following removal of contaminants;
 b. a filter element having a first end, a second end, a passage extending along the element between the first and second ends and a filter media component extending around the passage, the filter element being locatable within the chamber in a flow path extending between the inlet and the outlet so that fluid flowing along the flow path is directed through the filter media component;
 c. in which the housing opening is dimensioned so that the filter element can pass through the opening for location in the chamber, and in which the filter assembly comprises a cover which can be coupled to the housing to close the opening and secure the filter element within the chamber;
 d. at least one first alignment assembly having a first alignment component and a second alignment component, one of the first and second alignment components being provided by the housing and disposed within the chamber, and the other being provided by the filter element and comprising a flange projecting radially outward, away from an outer surface of the filter media component around an entire outer perimeter of the filter element and describing an outermost circular perimeter of the filter element, the flange including an alignment component comprising a plurality of recesses extending inwardly from a circular perimeter of the flange, the first and second alignment components cooperating to rotationally orient the filter element within the chamber; and
 e. at least one second alignment assembly having a first alignment component and a second alignment component, one of the first and second alignment components being provided by the housing and disposed within the chamber, and the other being provided by the cover, the first and second alignment components cooperating to rotationally orient the cover relative to the housing and so to the filter element.

2. The filter assembly as claimed in claim 1, in which the filter element is disposed in an offset location within the chamber.

3. The filter assembly as claimed in claim 1, in which the chamber has a longitudinal axis extending between first and second opposite axial ends of the chamber, and in which the outlet is spaced from and extends generally transverse to the longitudinal axis.

4. The filter assembly as claimed in claim 1, in which the filter element and the housing are arranged so that, when the filter element is located within the chamber, a generally annular space exists between an outer surface of the filter element and an inner surface of a wall of the housing wall, and in which a width of the annular space varies around a perimeter of the filter element.

5. The filter assembly as claimed in claim 4, in which a distance between the outer surface of the filter element and the chamber outlet is greater than a distance between the outer surface and the housing wall at a location that is spaced around a perimeter of the chamber from the outlet.

6. The filter assembly as claimed in claim 1, in which the filter element is non-coaxially located within the chamber.

7. The filter assembly as claimed in claim 1, in which the first and second alignment components of the first alignment assembly cooperate to rotationally orient the filter element within the chamber so that a longitudinal axis of the filter element is offset relative to a longitudinal axis of the chamber.

8. The filter assembly as claimed in claim 1, in which the filter element passage has a first opening at the first end and a second opening at the second end of the element, and in which the first and second alignment components of the second alignment assembly cooperate to rotationally orient the cover relative to the housing so that the cover closes the opening of the filter element passage disposed adjacent the cover when the cover is coupled to the housing.

9. The filter assembly as claimed in claim 1, in which the filter element passage extends along the filter element between an opening at the first end and an opening at the second end, and in which the cover comprises a pressure relief valve which closes the opening at the one of the first and second ends of the filter element that is disposed adjacent the cover when the filter element is located in the chamber and the cover is coupled to the housing.

10. The filter assembly as claimed in claim 9, in which the pressure relief valve is biased to a closed position and is movable to an open position when the pressure of fluid within the passage of the filter element reaches a predetermined level.

11. The filter assembly as claimed in either claim 9, in which the pressure relief valve is eccentrically located within the cover.

12. The filter assembly as claimed in claim 11, in which:
a. the cover has a centre, the pressure relief valve has a centre, and the centre of the valve is offset relative to the centre of the cover;
b. a longitudinal axis of the filter element is offset relative to a longitudinal axis of the chamber; and
c. the centre of the valve is substantially aligned with the longitudinal axis of the filter element.

13. The filter assembly as claimed in claim 1, in which the first and second alignment components of the first alignment assembly cooperate to define a single permissible rotational orientation of the filter element within the chamber.

14. The filter assembly as claimed in claim 1, in which the first and second alignment components of the second alignment assembly cooperate to define a single permissible rotational orientation of the cover relative to the housing.

15. The filter assembly as claimed in claim 1, in which the one of the first and second alignment components of the first alignment assembly provided by the housing, and the one of the first and second alignment components of the second alignment assembly provided by the housing, are provided by a single component.

16. The filter assembly as claimed in claim 1, in which the first alignment assembly comprises more than one first alignment component and more than one second alignment component, and in which the alignment components provided by the housing are arranged in a pattern which is matched by the alignment components provided by the filter element.

17. The filter assembly as claimed in claim 1, in which the second alignment assembly comprises more than one first alignment component and more than one second alignment component, and in which the alignment components provided by the housing are arranged in a pattern which is matched by the alignment components provided by the cover.

18. The filter assembly as claimed in claim 1, in which the alignment components provided by the housing extend inwardly from a wall of the housing into the chamber.

19. The filter assembly as claimed in claim 1, in which:
a. the first alignment component of the first alignment assembly is a male alignment component and the second alignment component is a female alignment component;
b. the first alignment component of the second alignment assembly is a male alignment component and the second alignment component is a female alignment component; and
c. the female alignment components are each adapted to cooperate with the respective male alignment component by receiving the male component in a sliding fit.

20. The filter assembly as claimed in claim 19, in which the female alignment components each define a keyway and the male alignment components each define a key shaped to engage in the keyway.

21. The filter assembly as claimed in claim 1, in which the first alignment assembly comprise a plurality of first alignment components and a corresponding plurality of second alignment components, and in which the alignment components of the first alignment assembly provided by the housing are provided on a wall of the housing and are non-equidistantly spaced apart around a perimeter of the chamber.

22. The filter assembly as claimed in claim 21, in which an angle between one alignment component provided by the housing and an adjacent alignment component, taken in a first direction around the perimeter, is different to an angle between the one alignment component and an adjacent alignment component, taken in a second direction around the perimeter.

23. The filter assembly as claimed in claim 1, in which the second alignment assembly comprises a plurality of first alignment components and a corresponding plurality of second alignment components, and in which the alignment components of the second alignment assembly provided by the housing are non-equidistantly spaced apart around a perimeter of the chamber.

24. The filter assembly as claimed in claim 23, in which an angle between one alignment component provided by the housing and an adjacent alignment component, taken in a first direction around the perimeter, is different to an angle between the one alignment component and an adjacent alignment component, taken in a second direction around the perimeter.

25. The filter assembly as claimed in claim 1, in which at least one alignment component provided by the housing extends generally parallel to a radius of the chamber.

26. The filter assembly as claimed in claim 1, in which at least one alignment component provided by the housing is disposed substantially on a line which is transverse to a radius of the chamber.

27. The filter assembly as claimed in claim 1, in which the housing comprises a plurality of alignment components, and in which at least one alignment component provided by the housing extends generally parallel to a radius of the chamber, and at least one alignment component provided by the housing is disposed substantially on a line which is transverse to a radius of the chamber.

28. The filter assembly as claimed in claim 1, in which the cover comprises an outer lid portion and an inner wall portion extending from the lid portion in a direction towards the chamber when the cover is coupled to the housing.

29. The filter assembly as claimed in claim 1, in which the alignment components of the second alignment assembly provided by the cover are non-equidistantly spaced apart around a perimeter of the cover.

30. The filter assembly as claimed in claim 29, in which an angle between one alignment component provided by the cover and an adjacent alignment component, taken in a first direction around the perimeter, is different to an angle between the one alignment component and an adjacent alignment component, taken in a second direction around the perimeter.

31. The filter assembly as claimed in claim 1, in which the chamber has a first axial end defining the inlet and a second axial end, at least one alignment component provided by the housing extending from the first end of the chamber part way along a length of the chamber towards the second end, and at least one further alignment component provided by the housing extending from the first end to the second end along the entire length of the chamber.

32. The filter assembly as claimed in claim 1, in which the cover comprises an engagement feature for engaging a corresponding engagement feature of the housing, and in which the cover comprises a part defining the engagement feature and a part defining the alignment component of the second alignment assembly, the part defining the engagement feature being rotatable relative to the part defining the alignment component.

33. A filter assembly for filtering contaminants from a fluid stream, the filter assembly comprising:
   a. a housing defining a chamber and an opening which communicates with the chamber, the chamber having a longitudinal axis, an inlet arranged to receive a fluid stream including entrained contaminants, and an outlet through which the fluid stream can exit the chamber following removal of contaminants;
   b. a filter element having a first end, a second end, a longitudinal axis extending between the first and second ends, a passage extending along the element between the first and second ends and a filter media component extending around the passage, the filter element adapted to be located within the chamber in a flow path extending between the inlet and the outlet so that fluid flowing along the flow path is directed through the filter media component, the filter element including a flange projecting radially outward, away from an outer surface of the filter media component around an entire outer perimeter of the filter element and describing an outermost circular perimeter of the filter element, the flange including an alignment component comprising a plurality of recesses extending inwardly from a circular perimeter of the flange;
   c. in which the housing opening is dimensioned so that the filter element can pass through the opening for location in the chamber, and in which the filter assembly comprises a cover which can be coupled to the housing to close the opening and secure the filter element within the chamber; and
   d. in which the filter element and the housing are arranged so that, when the filter element is located within the chamber, the longitudinal axis of the filter element is offset relative to the longitudinal axis of the chamber.

34. A filter assembly for filtering contaminants from a fluid stream, the filter assembly comprising:
   a. a housing defining a chamber and an opening which communicates with the chamber, the chamber having a longitudinal axis, an inlet arranged to receive a fluid stream including entrained contaminants, and an outlet through which the fluid stream can exit the chamber following removal of contaminants, the outlet extending through a wall of the housing transverse to the longitudinal axis;
   b. a filter element having a first end, a second end, a passage extending along the element between the first and second ends and a filter media component extending around the passage, the filter element adapted to be located within the chamber in a flow path extending between the inlet and the outlet so that fluid flowing along the flow path is directed through the filter media component the filter element including a flange projecting radially outward, away from an outer surface of the filter media component around an entire outer perimeter of the filter element and describing an outermost circular perimeter of the filter element, the flange including an alignment component comprising a plurality of recesses extending inwardly from a circular perimeter of the flange;
   c. in which the housing opening is dimensioned so that the filter element can pass through the opening for location in the chamber, and in which the filter assembly comprises a cover which can be coupled to the housing to close the opening and secure the filter element within the chamber; and
   d. in which the filter element and the housing are arranged so that, when the filter element is located within the chamber, a generally annular space exists between an outer surface of the filter element and the housing wall, a distance between the outer surface and the chamber outlet being greater than a distance between the outer surface and the housing wall at a location that is spaced around a perimeter of the chamber from the outlet.

35. A filter assembly for filtering contaminants from a fluid stream, the filter assembly comprising:
   a. a housing defining a chamber and an opening which communicates with the chamber, the chamber having a longitudinal axis, an inlet arranged to receive a fluid stream including entrained contaminants, and an outlet through which the fluid stream can exit the chamber following removal of contaminants;
   b. a filter element having a first end, a second end, a longitudinal axis extending between the first and second ends, a passage extending along the element between an opening at the first end and an opening at the second end, and a filter media component extending around the passage, the filter element being adapted to be located within the chamber in a flow path extending between the inlet and the outlet so that fluid flowing along the flow path is directed through the filter media component, the filter element including a flange projecting radially outward, away from an outer surface of the filter media component around an entire outer perimeter of the filter element and describing an outermost circular perimeter of the filter element, the flange including an alignment component comprising a plurality of recesses extending inwardly from a circular perimeter of the flange;
   c. in which the housing opening is dimensioned so that the filter element can pass through the opening for location in the chamber, and in which the filter assembly comprises a cover which can be coupled to the housing to close the housing opening and secure the filter element within the chamber;
   d. in which the filter element and the housing are arranged so that, when the filter element is located within the chamber, the longitudinal axis of the filter element is offset relative to the longitudinal axis of the chamber; and
   e. in which the cover comprises a pressure relief valve which closes the opening at the one of the first and second ends of the filter element that is disposed adjacent the cover when the filter element is located in the chamber and the cover is coupled to the housing, the pressure relief valve being biased to a closed position and movable to an open position when the pressure of fluid within the passage of the filter element reaches a predetermined level.

36. The filtration system comprising the filter assembly as claimed in claim 35, and a separator for separating contaminants from the fluid stream provided upstream of the filter assembly and arranged so that the fluid stream exiting the separator passes to the inlet of the filter assembly for subsequent flow through the filter element.

37. A filter element for separating contaminants from a fluid stream, the filter element adapted to be located within a chamber defined by a housing of a filter assembly so that the filter element is in a flow path extending between an inlet of the chamber and an outlet of the chamber, the filter element comprising:
   a. a first end, a second end, a longitudinal axis extending between the first and second ends, a passage extending along the element between the first and second ends, and a filter media component extending around the passage; and
   b. a flange extending transverse to the longitudinal axis and projecting radially outward, away from an outer surface of the filter media component around an entire outer perimeter of the filter element and describing an outermost circular perimeter of the filter element, a first part of the outermost, circular perimeter defined by the flange disposed a first distance from the longitudinal axis, and a second part of the outermost, circular perimeter defined by the flange disposed a second distance from the longitudinal axis which is less than the first distance;
   c. in which the flange comprises an alignment component including a plurality of recesses extending inwardly from a circular perimeter of the flange along the first part of the outermost, circular perimeter of the filter element, which is adapted to cooperate with a further alignment component provided by the housing and disposed within the chamber, to facilitate rotational orientation of the filter element within the chamber.

38. The filter element as claimed in claim 37, in which the second part of the perimeter is spaced around the perimeter from the first part.

39. The filter element as claimed in claim 37, in which the flange comprises a plurality of alignment components, for cooperating with respective alignment components of the housing.

40. The filter element as claimed in claim 37, in which the alignment component of the flange is a female alignment component, and is adapted to cooperate with a male alignment component of the housing by receiving the male component in a sliding fit.

41. The filter element as claimed in claim 40, in which the female alignment component defines a keyway.

42. The filter element as claimed in claim 37, in which the flange comprises more than one alignment component, and the alignment components are non-equidistantly spaced apart around the perimeter of the flange.

43. The filter element as claimed in claim 42, in which an angle between one alignment component provided by the flange and an adjacent alignment component, taken in a first direction around the perimeter, is different to an angle between the one alignment component and an adjacent alignment component, taken in a second direction around the perimeter.

44. The filter element as claimed in claim 37, in which at least one alignment component provided by the flange extends generally parallel to a radius extending from a centre of the flange.

45. The filter element as claimed in claim 37, in which at least one alignment component provided by the flange is disposed on a line which is transverse to a radius extending from a centre of the flange.

46. The filter element as claimed in claim 37, in which the flange comprises a plurality of alignment components which each extend generally inwardly from the perimeter, and in which at least one alignment component extends inwardly a greater distance than at least one other alignment component.

47. The filter element as claimed in claim 37, in which the alignment component is a female component provided at the perimeter of the flange, the female component having an opening at the perimeter and extending inwardly from the opening.

48. The filter element as claimed in claim 37, in which the filter element has a cylindrical outer periphery and comprises a first end cap at the first end and a second end cap at the second end, the end caps each comprising an opening which communicates with the passage, the openings being coaxially aligned along the longitudinal axis, one of the end caps defining the flange and being arranged non-concentrically with respect to the other end cap with its opening disposed off-centre in the end cap, the passage being disposed coaxial to the longitudinal axis.

49. A filter element for separating contaminants from a fluid stream, the filter element adapted to be located within a chamber defined by a housing of a filter assembly so that the filter element is in a flow path extending between an inlet of the chamber and an outlet of the chamber, the filter element comprising:
   a. a first end, a second end, a longitudinal axis extending between the first and second ends, a passage extending along the element between the first and second ends, and a filter media component extending around the passage, the passage being coaxial to the longitudinal axis and the filter media component describing a cylindrical outer surface which is centred on the longitudinal axis;
   b. a flange extending transverse to the longitudinal axis and protruding beyond the outer surface of the element around an entire outer perimeter of the filter element and defining an outermost, circular perimeter of the filter element, a first part of the flange extending a first distance from the outer surface, and a second part of the flange extending a second distance from the outer surface which is less than said first distance;
   c. in which the filter element comprises an alignment component, said alignment component being provided by the flange and including a plurality of recesses extending inwardly from a circular perimeter of the flange along the first part of the flange, the alignment component adapted to cooperate with a further alignment component provided by the housing and disposed within the chamber, to facilitate rotational orientation of the filter element within the chamber.

50. A filter element for separating contaminants from a fluid stream, the filter element adapted to be located within a chamber defined by a housing of a filter assembly so that the filter element is in a flow path extending between an inlet of the chamber and an outlet of the chamber, the filter element comprising:
  a. a cylindrical outer periphery;
  b. a first end, a second end, a central axis extending between the ends and an internal cavity disposed on the central axis;
  c. a filter media component circumscribing the central axis; and
  d. a first end cap at the first end and a second circular end cap at the second end, the end caps each comprising an opening which communicates with the internal cavity, the openings being coaxially aligned along the central axis;
  e. in which one of the end caps is arranged non-concentrically with respect to the other end cap, with its opening disposed off-centre in the end cap, and in which said one end cap comprises a flange describing an outermost circular perimeter of the filter element and including an alignment component having a plurality of recesses extending inwardly from a circular perimeter of the flange, for rotationally orientating the filter element within the chamber.

51. A filter assembly for filtering contaminants from a fluid stream, the filter assembly comprising:
  a. a housing defining a chamber and an opening which communicates with the chamber, the chamber having an inlet arranged to receive a fluid stream including entrained contaminants, and an outlet through which the fluid stream can exit the chamber following removal of contaminants;
  b. a filter element having a first end, a second end, a longitudinal axis extending between the first and second ends, a passage extending along the element between the first and second ends and a filter media component extending around the passage, the filter element being locatable within the chamber in a flow path extending between the inlet and the outlet so that fluid flowing along the flow path is directed through the filter media component the filter element further including, the filter element further including a flange extending transverse to the longitudinal axis, the flange describing an outermost perimeter of the filter element, a first part of the perimeter defined by the flange disposed a first distance from the longitudinal axis, and a second part of the perimeter defined by the flange disposed a second distance from the longitudinal axis which is less than the first distance;
  c. in which the housing opening is dimensioned so that the filter element can pass through the opening for location in the chamber, and in which the filter assembly comprises a cover which can be coupled to the housing to close the opening and secure the filter element within the chamber;
  d. at least one first alignment assembly having a first alignment component and a second alignment component, one of the first and second alignment components being provided by the housing and disposed within the chamber, and the other being provided by the flange of the filter element, and describing an outermost circular perimeter of the filter element, the other alignment component including a plurality of recesses extending inwardly from a circular perimeter of the flange, the first and second alignment components cooperating to rotationally orient the filter element within the chamber; and
  e. at least one second alignment assembly having a first alignment component and a second alignment component, one of the first and second alignment components being provided by the housing and disposed within the chamber, and the other being provided by the cover, the first and second alignment components cooperating to rotationally orient the cover relative to the housing and so to the filter element.

52. A closed crankcase ventilation (CCV) system comprising a filter assembly as claimed in claim 51.

53. An engine comprising a closed crankcase ventilation system as claimed in claim 52.

54. The filter element as in claim 37, wherein no part of the flange extends radially outward past its outermost, circular perimeter.

55. The filter element as in claim 37, further including a first circular end cap at the first end and a second circular end cap at the second end, one of the end caps defining the flange.

56. The filter element as claimed in claim 37, wherein the flange includes flats around its outermost circular perimeter.

57. The filter element as claimed in claim 55, wherein the end caps each include a central opening which communicates with the passage, the openings being coaxially aligned along the longitudinal axis, the one end cap being arranged non-concentrically with respect to the other end cap with the opening of the one end cap disposed off-centre in the one end cap, the passage being disposed coaxial to the longitudinal axis.

58. The filter element as in claim 49, wherein no part of the flange extends radially outward past its outermost, circular perimeter.

59. The filter element as in claim 49, further including a first circular end cap at the first end and a second circular end cap at the second end, one of the end caps defining the flange.

60. The filter element as claimed in claim 55, wherein the flange includes flats around its outermost circular perimeter.

61. The filter element as claimed in claim 59, wherein the end caps each include a central opening which communicates with the passage, the openings being coaxially aligned along the longitudinal axis, the one end cap being arranged non-concentrically with respect to the other end cap with the opening of the one end cap disposed off-centre in the one end cap.

62. The filter element as in claim 50, wherein no part of the flange extends radially outward past its outermost, circular perimeter.

63. The filter element as in claim 50, wherein the one end cap includes flats around the outermost circular perimeter of the one end cap.

* * * * *